United States Patent [19]
Kawai et al.

[11] Patent Number: 6,023,276
[45] Date of Patent: *Feb. 8, 2000

[54] IMAGE PROCESSING APPARATUS AND METHOD FOR FORMING A THREE-DIMENSIONAL DISPLAY

[75] Inventors: Tomoaki Kawai, Yokohama; Masatoshi Okutomi, Kawasaki; Shinji Uchiyama; Masakazu Fujiki, both of Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/493,288

[22] Filed: Jun. 21, 1995

[30] Foreign Application Priority Data

Jun. 24, 1994 [JP] Japan .................................. 6-142791

[51] Int. Cl.$^7$ .................................... G06T 17/00

[52] U.S. Cl. ............................ 345/419; 345/420

[58] Field of Search ..................... 395/119, 141, 395/143; 348/44–47, 51; 353/6, 7; 359/458; 600/166; 345/419–20, 423, 4, 433, 441, 443; 382/190, 201

[56] References Cited

U.S. PATENT DOCUMENTS

| | | | |
|---|---|---|---|
| 4,858,157 | 8/1989 | Murai et al. ............................. | 364/560 |
| 4,875,165 | 10/1989 | Fencil et al. ............................ | 364/413 |
| 4,935,810 | 6/1990 | Nonami et al. .......................... | 358/98 |
| 4,965,840 | 10/1990 | Subbarao .................................. | 382/1 |
| 4,982,438 | 1/1991 | Usami et al. ............................. | 382/25 |
| 5,016,173 | 5/1991 | Kenet et al. ....................... | 364/413.13 |
| 5,202,928 | 4/1993 | Tomita et al. ............................. | 382/1 |
| 5,276,613 | 1/1994 | Schlumberger .................... | 364/413.16 |
| 5,493,595 | 2/1996 | Schoolman ................................ | 378/41 |
| 5,519,485 | 5/1996 | Ohtani et al. .............................. | 365/6 |
| 5,548,694 | 8/1996 | Gibson ................................... | 345/424 |
| 5,633,995 | 5/1997 | McClain ................................ | 345/419 |
| 5,692,061 | 11/1997 | Sasada et al. .......................... | 382/126 |

FOREIGN PATENT DOCUMENTS

| | | |
|---|---|---|
| 7152928 | 6/1995 | Japan . |
| 2244621 | 12/1991 | United Kingdom . |

OTHER PUBLICATIONS

Chen et al, "A Robot Vision System for Recognizing 3–D Objects in Low–Order Polynomial Time", *IEEE Transactions on Systems, Man and Cybernetics*, vol. 19, No. 6, pp. 1535–1563, Nov./Dec. 1989.

Hoff, et al, "Surfaces from Stereo: Integrating Feature Matching, Disparity Estimation, and Contour Detection", *IEEE Transactions on Pattern Analysis and Machine Intelligence*, vol. 11, No. 2, pp. 121–136, Feb. 1989.

Maruyama, et al, "Acquiring a Polyhedral Structure Through Face Extraction and Verification", *IEEE Pattern Recognition*, 1988 9th International Conference, pp. 579–581, 1988 .

Dhond, et al, "Structure from Stereo—A Review", *IEEE Transactions on Systems, Man and Cybernetics*, vol. 19, No. 6, pp. 1489–1510, Nov. 1989.

Roman, et al, "Interactive Complexity Control and High–Speed Stereo Matching", *Computer Vision and Pattern Recognition*, pp. 171–176, 1988.

*Primary Examiner*—Mark R. Powell
*Assistant Examiner*—Huedung X. Cao
*Attorney, Agent, or Firm*—Fitzpatrick Cella Harper & Scinto

[57] ABSTRACT

Inputted right and left images of a stereoscopic image are displayed on a bitmap display 1-5, and vertices to be used for forming three dimensional model of each object are inputted by a pointing device 1-7. At this time, if objects to be processed have to be changed, an instruction for changing objects is issued. Accordingly, it is possible to input and manage point data of each object independently.

24 Claims, 32 Drawing Sheets

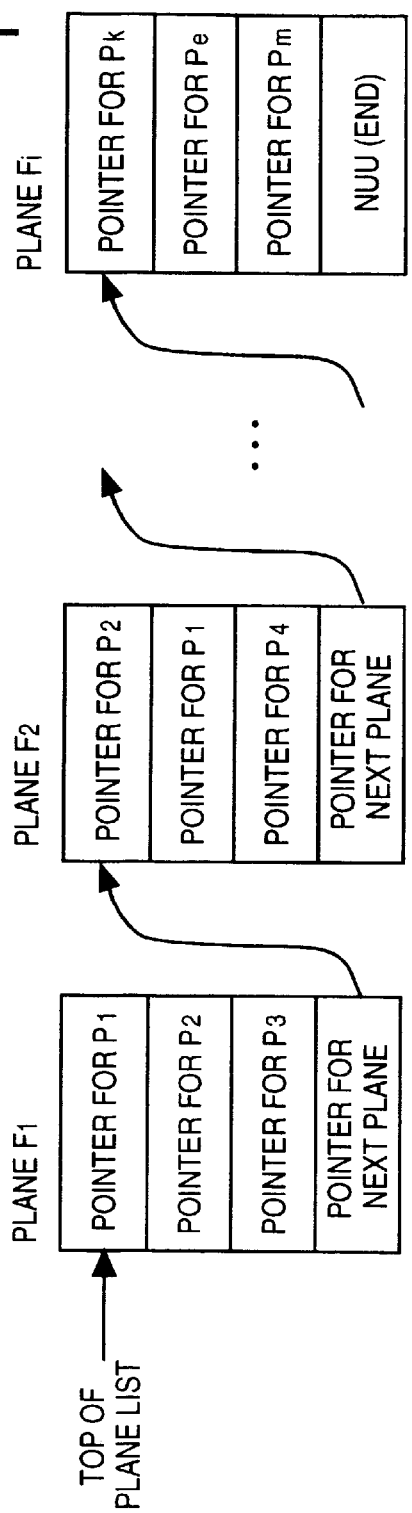

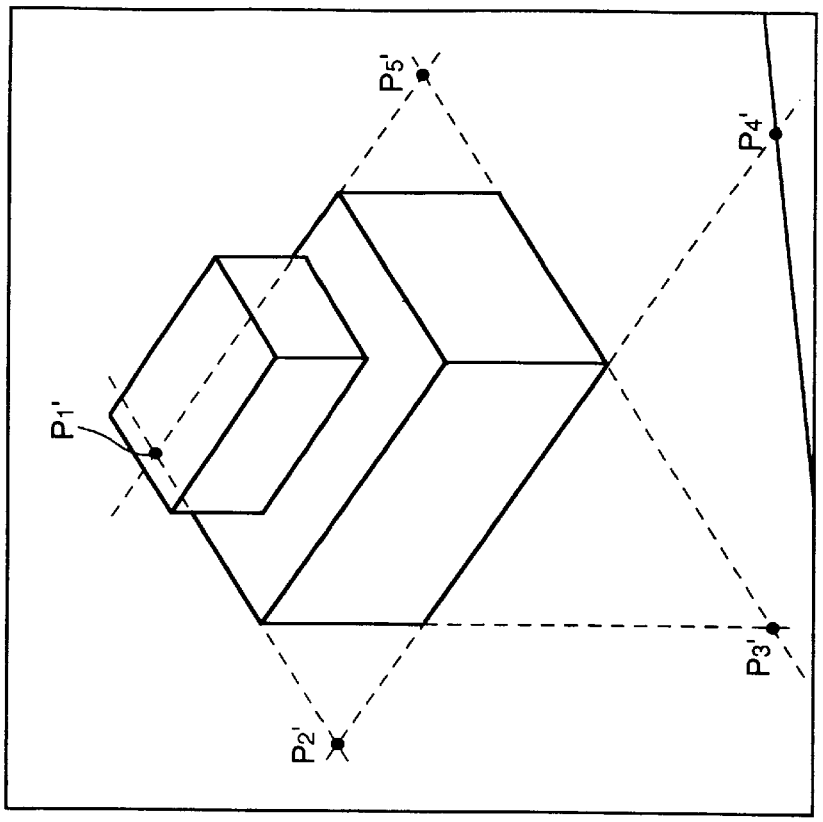
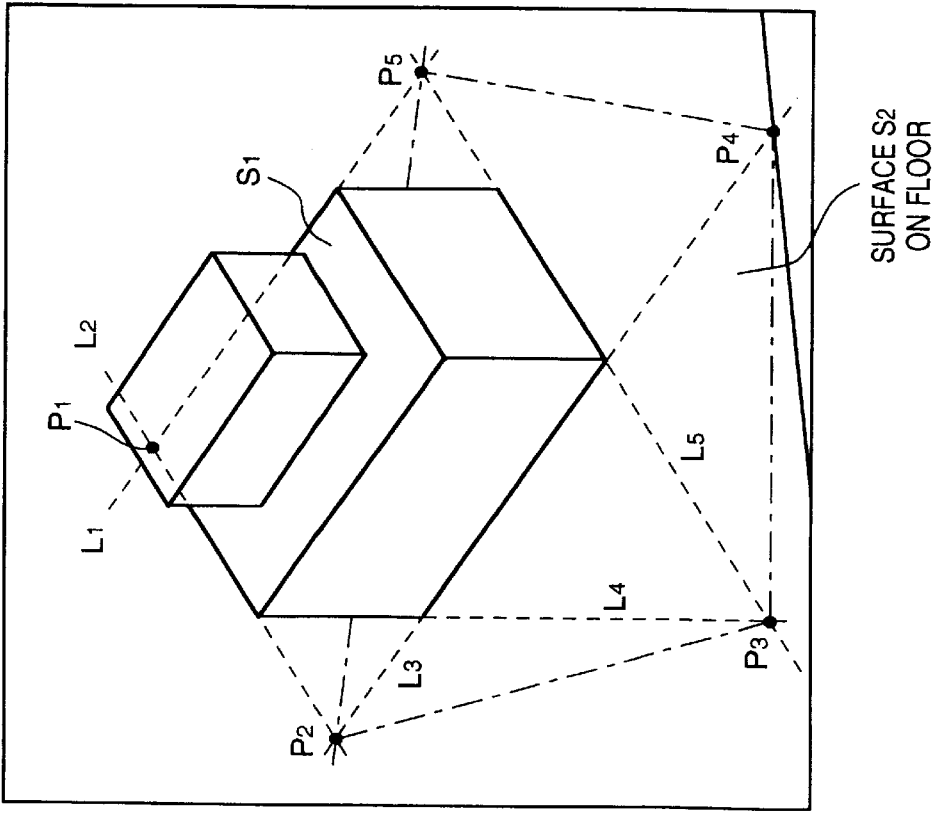
FIG. 15

FIG. 18
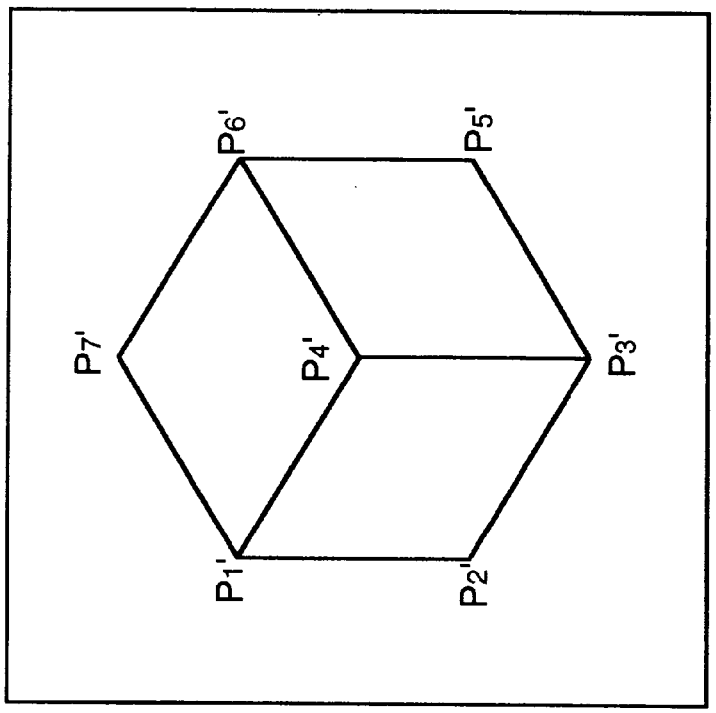
RIGHT IMAGE
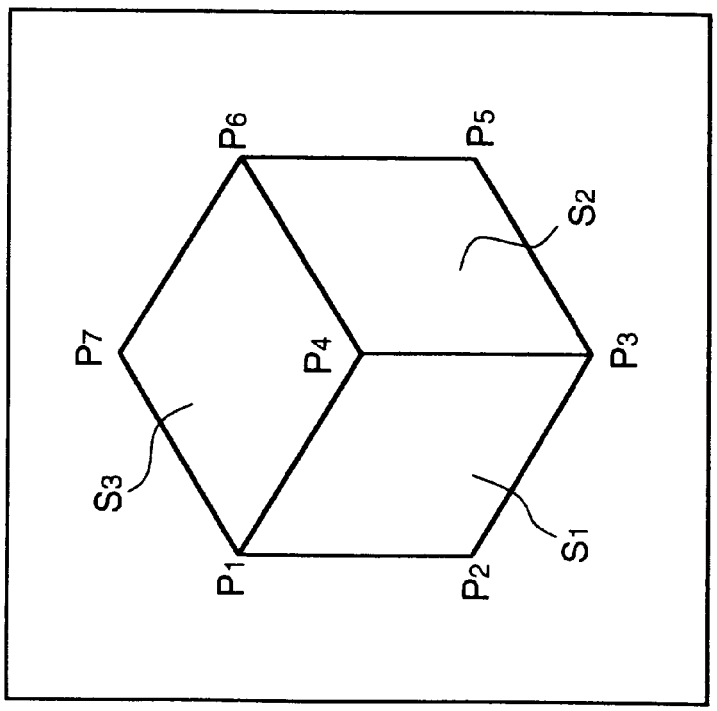
LEFT IMAGE

FIG. 19
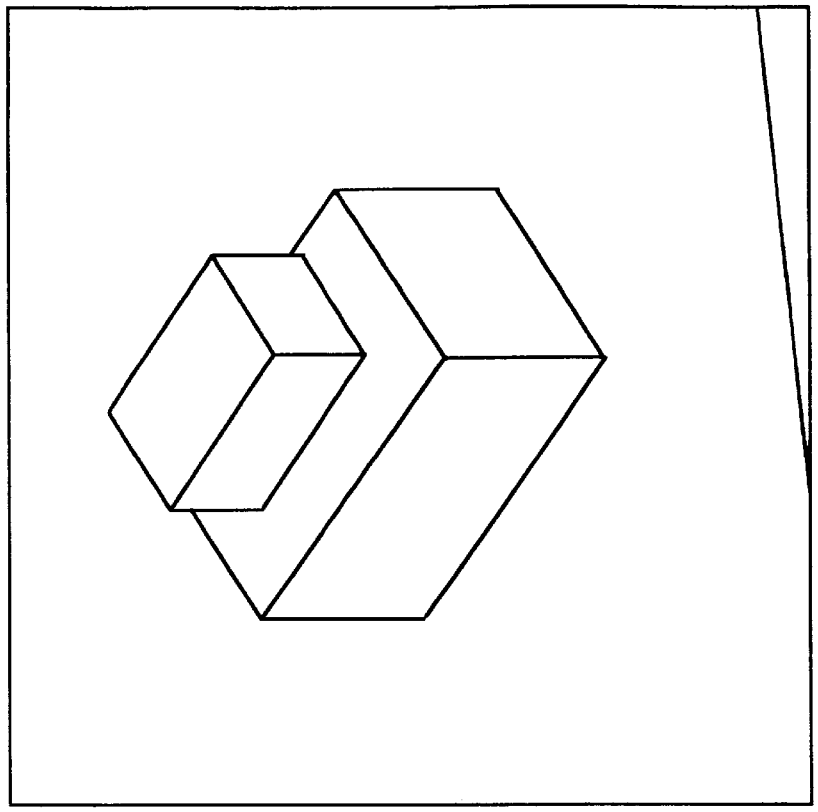
RIGHT IMAGE
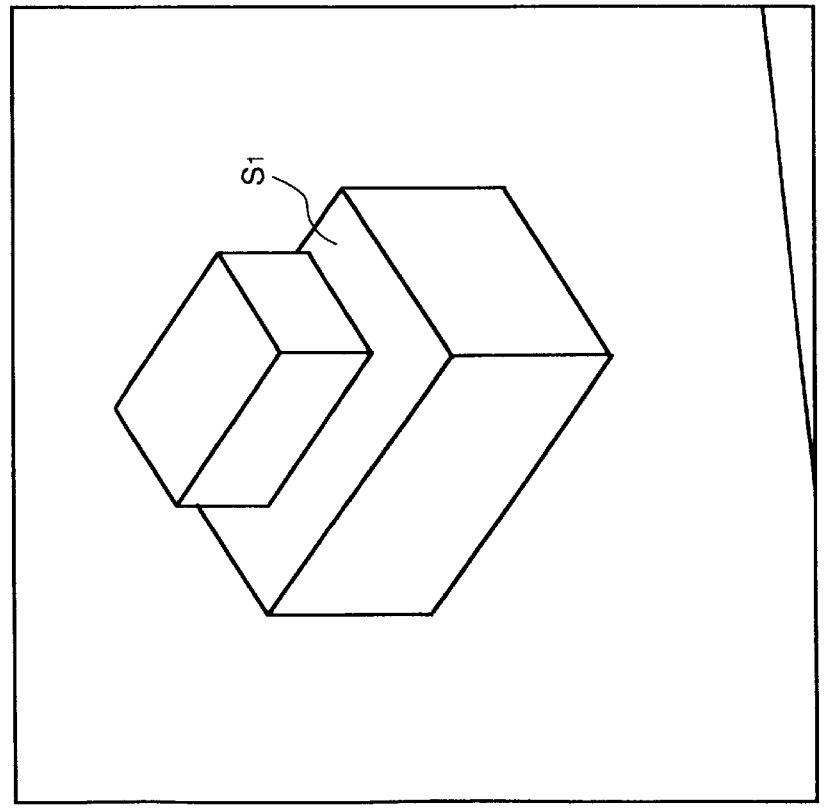
LEFT IMAGE

IMAGE PROCESSING APPARATUS AND METHOD FOR FORMING A THREE-DIMENSIONAL DISPLAY

BACKGROUND OF THE INVENTION

The present invention relates to an image processing apparatus and method and, more particularly, to an image processing apparatus and method which recognize the three dimensional geometric shape of a stereoscopic image using the right and left images of the object.

For recognizing a three dimensional geometrical shape of an object using right and left images of a stereoscopic image picked-up by a stereoscopic camera or the like, there is a conventional system for finding three dimensional coordinates by finding all corresponding points in the right and left images by a matching process and the like.

However, in the above-type system, since a computer automatically finds the corresponding points, there is a fear that the located corresponding points may not actually correspond to each other. Further, because all the corresponding points are searched, the computer has to perform great many calculations and it requires considerable time to obtain the three dimensional coordinates.

For the purpose of overcoming these problems, the assignee of the present invention has submitted a patent application regarding a method where a user interrupts the computer and designates corresponding points for finding a three dimensional shape in Japanese Patent Application No. 5-299515 (applied on Nov. 30, 1993). According to this method, after the three dimensional coordinates are found from corresponding points of the right and left images of a stereoscopic image, a triangle connecting the three dimensional coordinate points is generated, thus forming a plane. In the method proposed by the assignee, a triangulation net method and the like based on the Delaunay's principle is used for generating the triangle.

Generally, a plurality of three dimensional objects are often included in an image. If there are a plurality of objects in an image, all the objects including background are always dealt with as a single three dimensional shape when a conventional method is employed. In another case, it is possible to deal with only an area portion, designated by a user interruptedly, in the image as a single object. More specifically, even if a plurality of objects are included in an image, there is no apparatus capable of recognizing the objects separately in three dimensional space. Therefore, the plurality of objects are always dealt with as a single object (including objects constructing background).

Further, right and left images are only used for inputting three dimensional shape, and have not been used as texture information.

Furthermore, there is a problem in which, when a method for generating a plane uses Delaunay triangulation net, if there is a three dimensional concave area in an object, the concave area can not be recognized.

Further, it is necessary to designate all the corresponding points in the right and left images manually, a user has to perform quite a lot of manual operations. In addition, it is difficult to designate corresponding points in the right and left images of the stereoscopic image precisely by manual operation. Especially, if there is no clear texture information in the image, to designate the corresponding points is even more difficult.

SUMMARY OF THE INVENTION

The present invention has been made in consideration of the above situation, and has its object to provide an image processing apparatus and method capable of separately recognizing each object in the right and left images of a stereoscopic image.

According to the present invention, the foregoing object is attained by providing an image processing apparatus which displays inputted right and left images of a stereoscopic image consisting of one or more objects, designates pairs of corresponding points in the right and left images sequentially, and extracts three dimensional data, comprising: input means for inputting corresponding points of each object in the displayed right and left images; and management means for managing the inputted corresponding points of each object.

It is another object of the present invention to provide an image processing apparatus and method capable of extracting more precise three dimensional data by extracting data of hidden areas in given right and left images of a stereoscopic image.

Accordingly, the foregoing object is attained by providing an image processing apparatus which displays inputted right and left images of a stereoscopic image consisting of one or more objects, designates pairs of corresponding points in the right and left images sequentially, and extracts three dimensional data, comprising: supplementary line drawing means for drawing a supplementary line or lines in the displayed right and left images; and extracting means for extracting the corresponding points from the right and left images on the basis of the drawn supplementary line or lines.

It is another object of the present invention to provide an image processing apparatus and method which improve operation environment for extracting three dimensional data from the right and left images of a stereoscopic image.

Accordingly, the foregoing object is attained by providing an image processing apparatus which extracts three dimensional data from inputted right and left images of a stereoscopic image consisting of one or more objects, comprising: display means for displaying the right and left images; first designation means for designating a characteristic point in one of the right and left images; and extracting means for extracting a point corresponding to the characteristic point in the other image on the basis of the characteristic point designated by the first designation means, wherein three dimensional coordinate data is obtained on the basis of the characteristic point designated by the first designation means and the point extracted by the extracting means.

As will be described below, according to the present invention, when a plurality of three dimensional objects are included in right and left images of a stereoscopic image, by providing means for obtaining a three dimensional shape as well as means for registering and managing a plurality of three dimensional shapes, three dimensional shapes of the plurality of objects can be dealt with separately.

Further, there is provided an image processing apparatus capable of displaying and recognizing three dimensional shapes of a plurality of objects by providing means for displaying a plurality of stored three dimensional shape data by switching the data to be displayed.

Furthermore, since not only three dimensional shapes but also texture information are inputted, it is possible to perform three dimensional texture mapping display by using means for texture mapping, without inputting the texture information separately besides the right and left image data for the stereoscopic image.

Further, regarding an object having a concave area which has not been dealt with conventionally when a plane generating method using the Delaunay triangulation net is used, it can be dealt with as a group of a plurality of convex objects one at a time.

Further, an operation to put triangular patches can be performed by designating all the corresponding points interruptedly, for example, without using the Delaunay triangulation net (method 1).

Further, there is provided a function in which, by designating a single point which is a vertex of a three dimensional geometric shape model in either a right or left image, a corresponding point in the other image is automatically searched. With this function, the number of point to be manually designated is reduced to one from two which represent a pair of corresponding points (method 1).

Further, a function which automatically corrects gap in position of a point, designated roughly in either a right or left image, which corresponds to a point designated in the other image is provided (method 2).

Further, by displaying marks indicating designated points in right and left images at positions of the designated points, the positions of the designated points can be confirmed as well as the designation of corresponding points can be canceled and new corresponding points can be designated.

By providing a method for determining a pair of points manually designated in right and left images as a pair of corresponding points and aforesaid methods 1 and 2, a most suitable method can be selected. However, in an area where the texture information is unclear, precise corresponding points can not be determined even if one of aforesaid method is used. In order to deal with such situation, supplementary lines (either straight lines or curved lines) in the right and left images are drawn and points obtained from the supplementary lines, such as intersections of the supplementary lines, are considered as corresponding points, thereby it becomes easy to designate corresponding points in the right and left images of a stereoscopic image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing a construction of a plane list according to the first embodiment;

FIG. 7 is a table showing correspondence among object names, the point list, and the plane list used in the first embodiment;

FIG. 15 is a diagram illustrating states where a supplementary lines are drawn according to a third embodiment;

FIG. 18 is a diagram illustrating correspondence between points in right and left images for an stereoscopic image;

FIG. 19 is a diagram illustrating an example of right and left images of a stereoscopic image in which inconvenience occurs when a plane is to be defined precisely;

DETAILED DESCRIPTION OF THE PREFERRED EMBODIMENTS

Preferred embodiment of the present invention will be described in detail in accordance with the accompanying drawings.

<First Embodiment>

Figure 1:
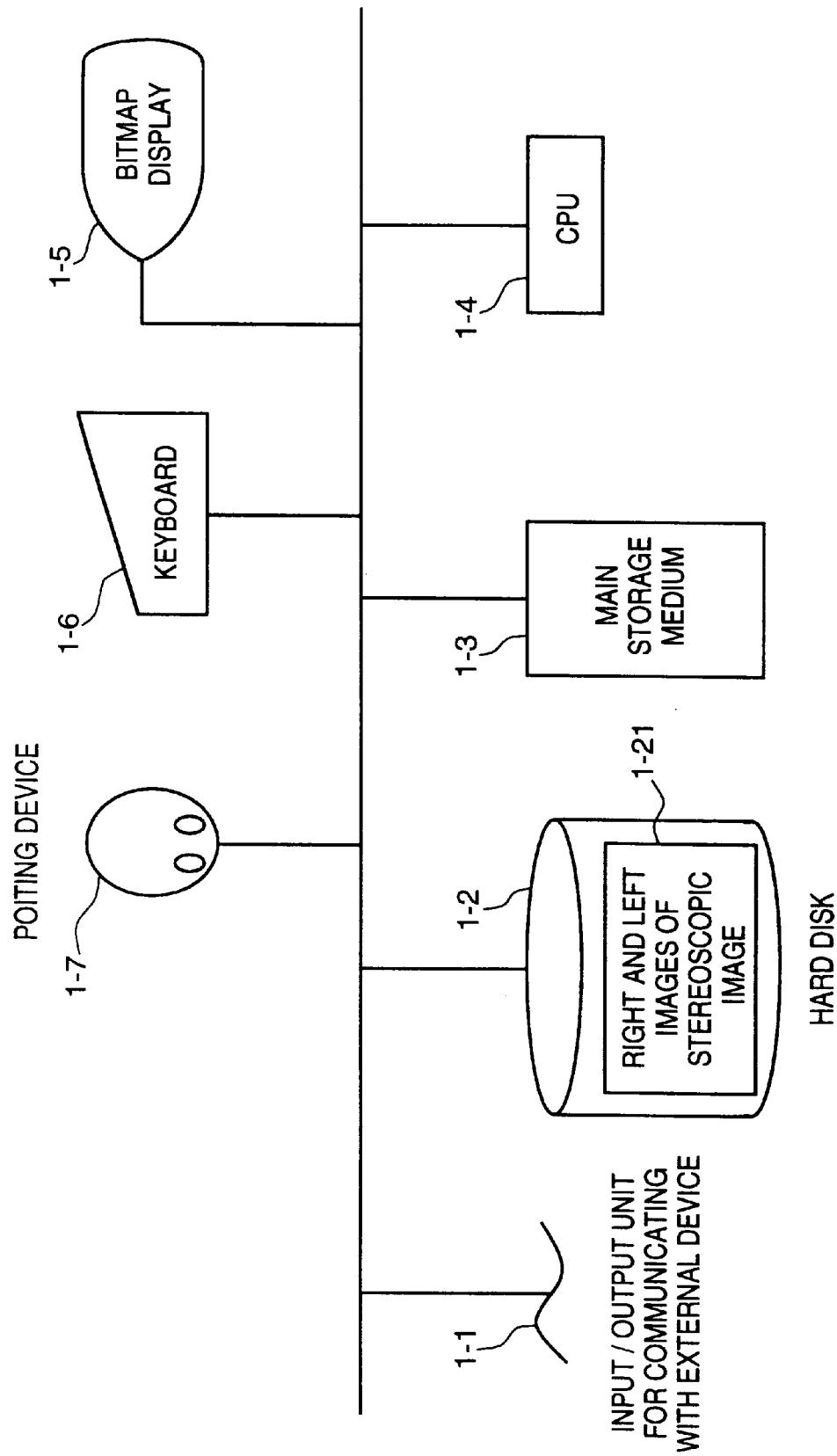
FIG. 1 is a block diagram showing a configuration of an apparatus according to a first embodiment.

FIG. 1 is a block diagram showing a configuration of an apparatus according to a first embodiment.

In FIG. 1, reference numeral 1-1 denotes an input/output unit for interchanging information with an external device; 1-2, a hard disk which is a storage medium of a large capacity; 1-3, a main storage medium (composed of RAM and the like); 1-4, CPU which controls the entire apparatus; 1-5, a bitmap display (simply called "display", hereinafter) for displaying an image and it displays an image developed in a bit RAM area reserved in the main storage medium 1-3; 1-6, a keyboard for inputting various kinds of characters and instructions; and 1-7, a pointing device (a mouse in the embodiments) for moving a specific cursor to an arbitrary position on the display 1-5 and for issuing various kinds of instructions.

In the configuration as described above, data of right and left images of a stereoscopic image obtained by picking up by a stereoscopic camera, for example, is digitized by a predetermined device. (If the stereoscopic camera comprises a digitizing device, it is directly connected to the apparatus of the first embodiment.) Then, the digitizing device is connected to the input/output unit 1-1, thereby the digitized right and left images of a stereoscopic image (simply referred as "right and left images", hereinafter) are inputted in the apparatus of the first embodiment, and stored in the hard disk 1-2 (the stored right and left images are referred by reference numeral 1-21 in FIG. 1). By designating by the keyboard 1-6 or the pointing device 1-7, the designated right and left images are loaded from the hard disk 1-2 to a VRAM area in the main storage medium, then displayed on the display 1-5. Note that a method for inputting right and left images of the stereoscopic image in the apparatus of the present invention is not limited to the one described above. For example, the right and left images can be inputted from a floppy disk drive connected to the apparatus of the first embodiment or inputted through a communication line. The hard disk 1-2 stores the OS (operating system) and programs corresponding to processes shown in each flowchart which will be described later, besides the right and left image data. These data, programs are loaded in the main storage medium 1-3 properly and executed by the CPU 1-4.

Figure 3:
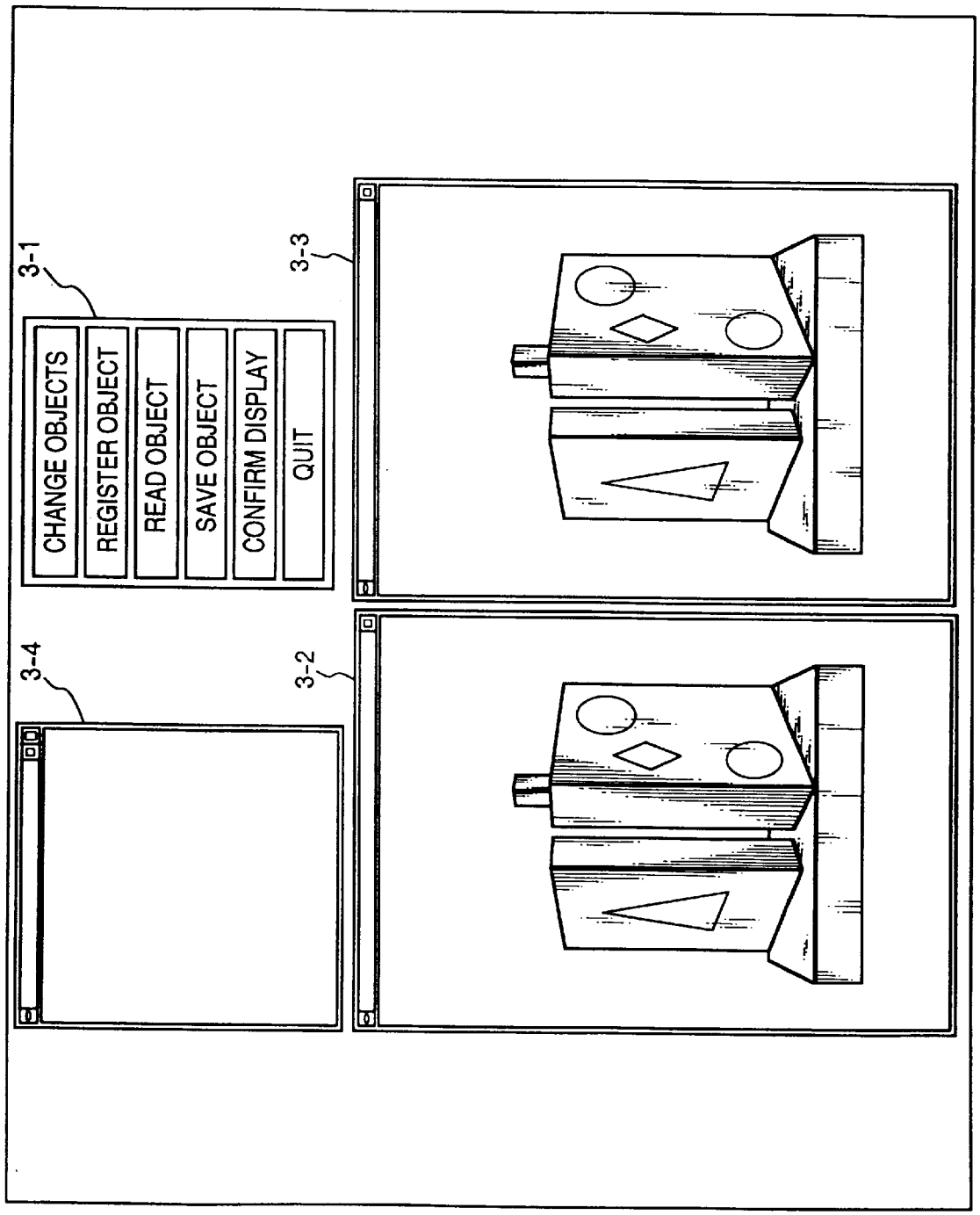
FIG. 3 is a diagram illustrating states of displayed right and left images of a stereoscopic image at an initial stage according to the first embodiment.

FIG. 3 shows an example to be displayed on the display 1-5 in the first embodiment. In FIG. 3, reference numeral 3-1 denotes an operation menu; 3-2 and 3-3, windows for displaying right and left images of a stereoscopic image, respectively; and 3-4, a window for displaying data of three dimensional shape inputted interruptedly. The method of inputting the data is expressed above.

Figure 2:
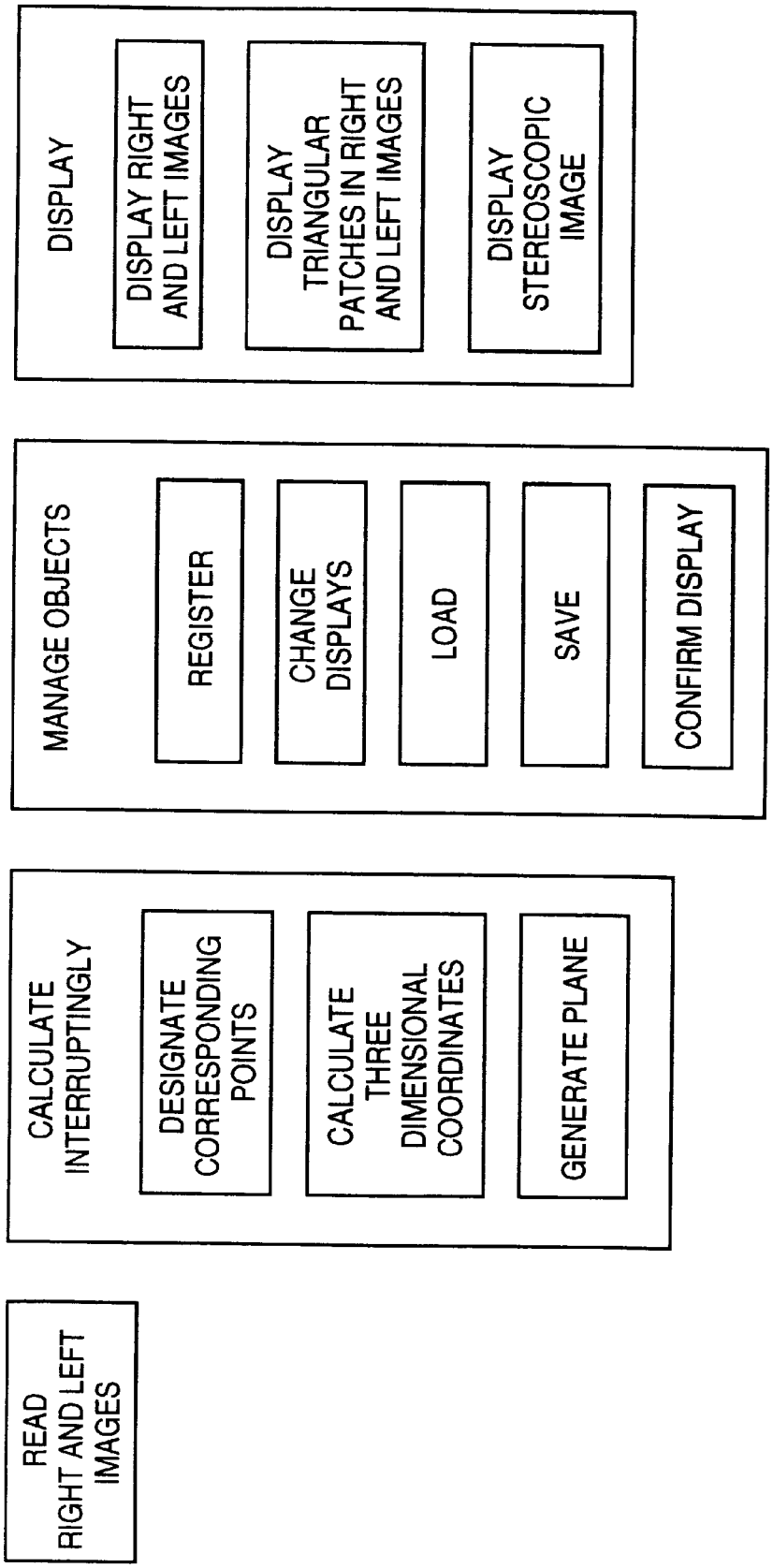
FIG. 2 shows program modules according to the first embodiment.
Figure 4:
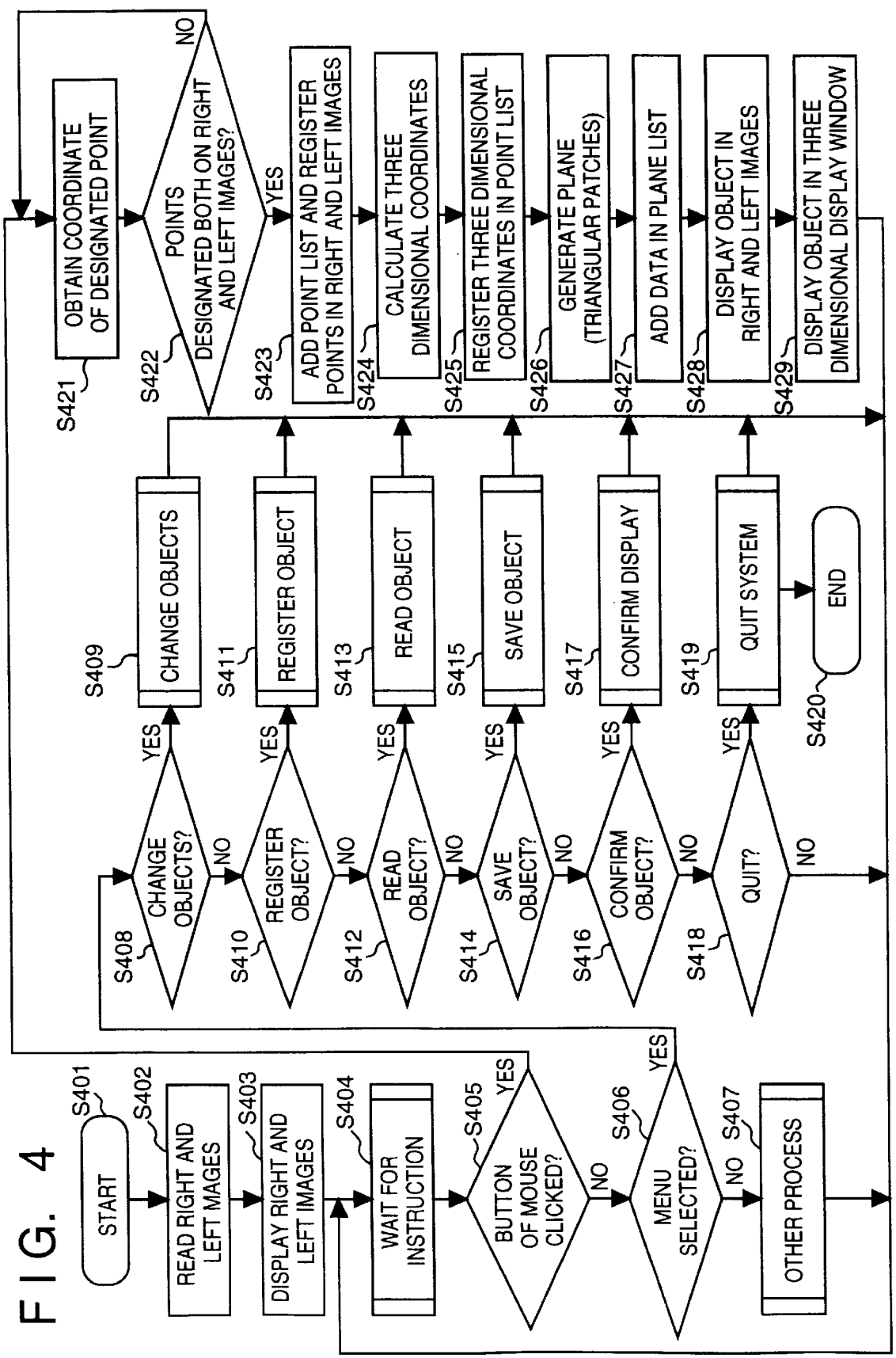
FIG. 4 is a flowchart showing contents of operations according to the first embodiment.

FIG. 4 is a flowchart showing processing of the first embodiment, and FIG. 2 shows program modules for executing processes of the flowchart in FIG. 4.

Operational sequence of FIG. 4 will be described referring to FIGS. 1 to 3. Programs to be used are loaded from the hard disk 1-2 to the main storage medium 1-3.

First, when the system is powered on, an initial menu (not shown) is displayed on the display. When "to read out right and left images of a stereoscopic image" is designated from the menu by the keyboard 1-6 or the pointing device 1-7, a list of sets of right and left images for stereoscopic images currently stored in the hard disk 1-2 is displayed. Then, one set in the list is selected. The designated right and left images (e.g., the right and left images 1-21) are loaded in a predetermined area in the main storage medium 1-3 (step S402), and displayed on the display in the form shown in FIG. 3. At this time, an operation menu and the like is displayed together. Accordingly, the left and right images for the stereoscopic image are displayed in the windows 3-2 and 3-3, respectively, on the display 1-5. Here, it is assumed that a picture shown in FIG. 3 is displayed on the display 1-5.

Next, the process is suspended until a user enters an instruct by using the pointing device 1-7 (step S404).

<A Process to Designate Coordinates (Add Points) by the Pointing Device>

In the above-described state of waiting for an instruction, when the apparatus detects a press of a button (click) coupled with the pointing device after the user moves a cursor which moves in relation to operations of the pointing device on the displayed right and left images, the process moves from step S405 to step S421 at which coordinates of the point designated by the pointing device are obtained.

At step S421 and step S422, the process is suspended until a point is designated both in the right and left images in the right window 3-3 and the left window 3-2. Then, positions of corresponding points in the right and left images are inputted. The designated points are considered as vertices of three dimensional shapes after being applied with successive processes of three dimensional coordinates calculation.

Note that, in the first embodiment, the corresponding points in the right and left images are designated manually on the basis of sight. However, it is possible to construct such an apparatus that, when a point either in a right or left image is designated, the corresponding point in the other image is automatically calculated by pattern matching and the like.

When the corresponding points both in the right and left images are determined, their coordinate data is stored in the main storage medium 1-3 or a hard disk 1-2, for example (step S423). The coordinate data of the designated corresponding points in the right and left images has configuration described in FIG. 5. More specifically, the coordinate data includes coordinates of the designated point in the right image, coordinates of the same in the left image, three dimensional coordinates obtained by performing calculations which will be described later on the basis of the coordinates of the right and left images, and an address (pointer) for specifying the next point, and these data are registered in a list (called "point list", hereinafter). When a pair of new corresponding points are designated, coordinate data of the points is added sequentially in the point list.

Figure 5:
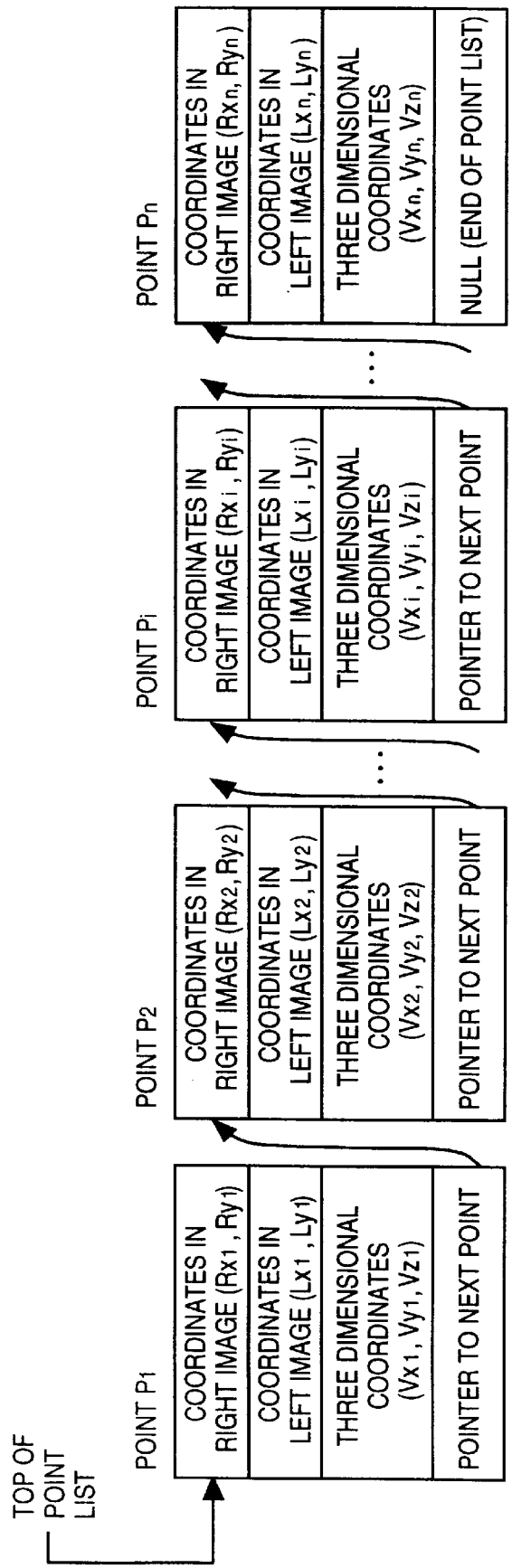
FIG. 5 is a diagram showing a construction of a point list according to the first embodiment.

In FIG. 5, regarding an i-th added point, coordinates on the left image (Lxi, Lyi), coordinates on the right image (Rxi, Ryi), three dimensional coordinates obtained by performing calculations which will be described later on the basis of the coordinates of the right and left images, (Vxi, Vyi, Vzi) are registered in the point list.

The aforesaid three dimensional coordinate calculations, generation of a plane, and three dimensional display are performed by performing processes at step S424 to step S429. Here, the processes are explained assuming that the i-th corresponding points are added. Note that three points which are latest inputted are the first, second and third ($P_i$, $P_{i-1}$, $P_{i-2}$) are used for the processes. The processes are described below.

First at step S424, the three dimensional coordinates (Vxi, Vyi, Vzi) are calculated by using the triangulation theory on the basis of the coordinates in the left and right images, (Lxi, Lyi) and (Rxi, Ryi), and camera parameters (described below) which are obtained in advance, and registered on the point list as the i-th data (step S425). Note, the camera parameters include image sensing conditions when cameras are sensing right and left images of a stereoscopic image, that is, information such as position, direction, and focal distance of the camera. Camera parameters for the left image and the right image (i.e., camera parameters for a camera for sensing the right image and a camera for sensing the left image) are separately set. The camera parameters are given in the system by using any suitable method in advance.

Next, a plane is generated on the basis of the point list whose coordinates are shown in FIG. 5. In the first embodiment, triangular patches are generated based on designated points on either a right or left image, and dealt with as planes. More specifically, three points are selected out of the points, (Rx1, Ry1), (Rx2, Ry2), . . . (Rxn, Ryn), in the right image (two dimensional plane), and triangular patches are generated one at a time. When the first three points are designated, a single triangle is generated. Regarding points designated after the third point, whenever a new point is designated, this point and two other points out of the points designated previously are selected and a new triangle is defined. Note that the two points designated prior to the newly designated point are selected so that the new triangle to be generated does not overlay the other triangles generated earlier. When a point is added, the existing triangles are re-evaluated and re-generated whenever it is necessary to do so, so that all triangles do not partially or wholly overlay each other.

Figure 13:
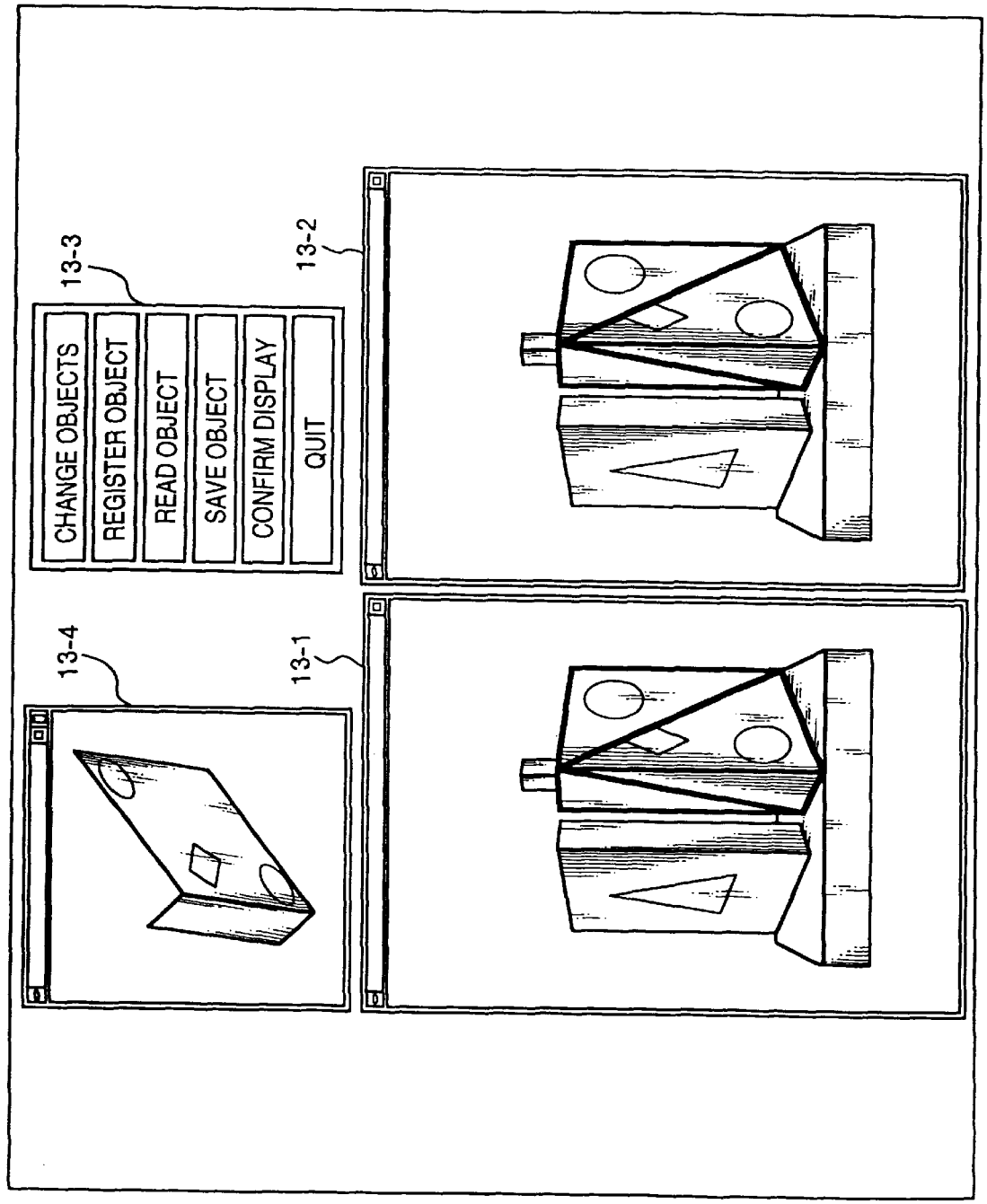
FIG. 13 is a diagram illustrating a display in the middle of edition according to the first embodiment.

FIG. 13 is an example of a picture on the display when triangular patches are shown on the images. In FIG. 13, a right window 13-2 shows the triangular patches on the right image. On the basis of this figure, a process for fitting triangular patches on each surface of objects in a left window 13-1 and in a three dimensional space window 13-4 is described below.

For example, first, attention is paid to a triangle generated by connecting points in the right image, (Rx1, Ry1), (Rx2, Ry2), and (Rx3, Ry3), and fetch coordinates of points in the left image and the three dimensional coordinates from point data, P1, P2, and P3, which correspond to the vertices of the triangle, in the point list. Then triangles for the left image and in the three dimensional space are obtained. Likewise, triangles in the three dimensional space window and in the three dimensional space are also obtained. Note that, in the three dimensional space window, it is necessary to set a position of a view point of an object, and the like, in advance.

As methods for generating a triangle, there is a method in which all the points in an image (in a two dimensional plane) are connected manually and a method following predetermined rules, for instance. Regarding the rules in the latter method, there is a method in which triangulation net is generated automatically on the basis of the Delaunay's principle. Note that, according to the triangulation net generation based on the Delaunay's principal, triangulation net connecting a group of points is generated so that a vertex having the smallest angle out of all the vertices of the generated triangle has the maximum angle (namely, the generated triangle is as close as a right triangle). This method is very effective for generating a triangular net automatically. However, since all the processes for generating the triangular net are performed automatically, it is not possible to explicitly leave a line connecting two points. The assignee of the present invention has proposed a method to overcome this problem in Japanese Patent Application No. 5-299515.

Data of the triangle generated as above is registered in a plane list having configuration shown in FIG. 6 (step S427). Each entry of the plane list consists of pointers to the three entries, each of which holds coordinates of each of three vertices of the triangle, in the point list, and a pointer to the next triangle. Accordingly, it is possible to generate an object consisting of two dimensional and three dimensional triangular patches by following the plane list.

Two dimensional triangular patches are displayed overlaid in the right and left images at step S428, and displayed as lines as shown in the windows 13-1 and 13-2 in FIG. 13.

Three dimensional triangular patches are displayed three-dimensionally as shown in the window 13-4 in FIG. 13. A wire frame display, a shading display, and other several methods are known as a three dimensional display method, and any three dimensional display method can be used here.

By repeating the aforesaid processes (steps S404, S405, and S421 to S429), a three dimensional shape is obtained.

It should be noted that the three dimensional shape obtained by performing aforesaid processes is of a single body, i.e., all the three dimensional objects in an image are considered as a joined single object. However, if the stereoscopic image is composed of a plurality of objects, it is necessary to perform the following processes so that each object is dealt with as an independent three dimensional shape.

<Menu Selection>

In order to overcome the above problem, each three dimensional object should be separated when data of an image of the three dimensional objects is inputted.

Accordingly, in this embodiment, an operation menu 3-1 (refer to FIG. 3) displayed on the display 1-5 is used during inputting the data.

There are several items for processing in the operation menu 3-1, and one of the items is designated by moving the cursor, which moves in relation to the pointing device 1-7, into a box, and clicking it.

At this time, the process proceeds from step S406 to step S408 in FIG. 4 and processes corresponding to each item in the menu are performed at subsequent steps.

Figure 9:
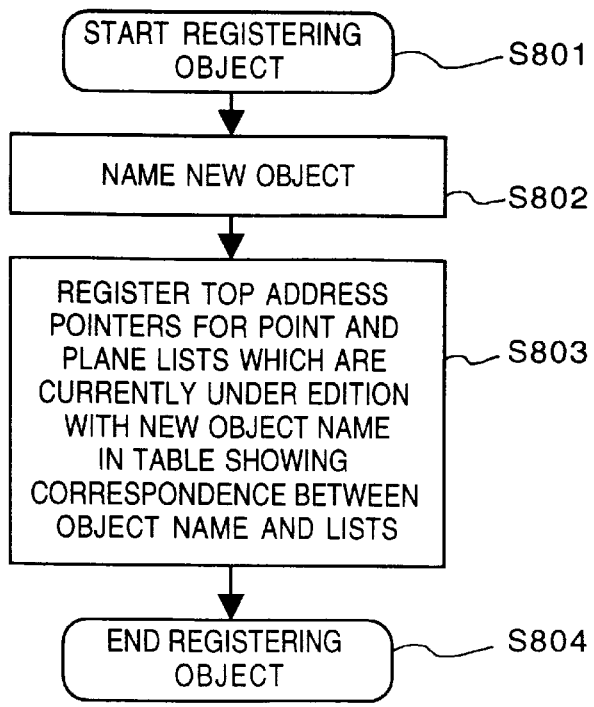
FIG. 9 is a flowchart showing a process to register an object according to the first embodiment.

First, a case where "register object" in the operation menu 3-1 is selected will be explained. In this case, the process moves from step S410 to step S411. The detail of the process performed at step S411 is shown in FIG. 9 as an example.

In this process, data of the generated triangular patches and of the three dimensional shapes (the point list and the plane list) is registered with names. At step S802 in FIG. 9, an object is named by inputting data from the keyboard 1-6. At step S803, the object names as well as the pointers designating tops of the entries which are under edition (referred as "top address pointer", hereinafter) in the point list and the plane list are stored in a table as shown in FIG. 7. This table may be stored in the hard disk 1-21, for example. The table is stored in relation to a file of right and left images of a stereoscopic image which is currently displayed.

Figure 8:
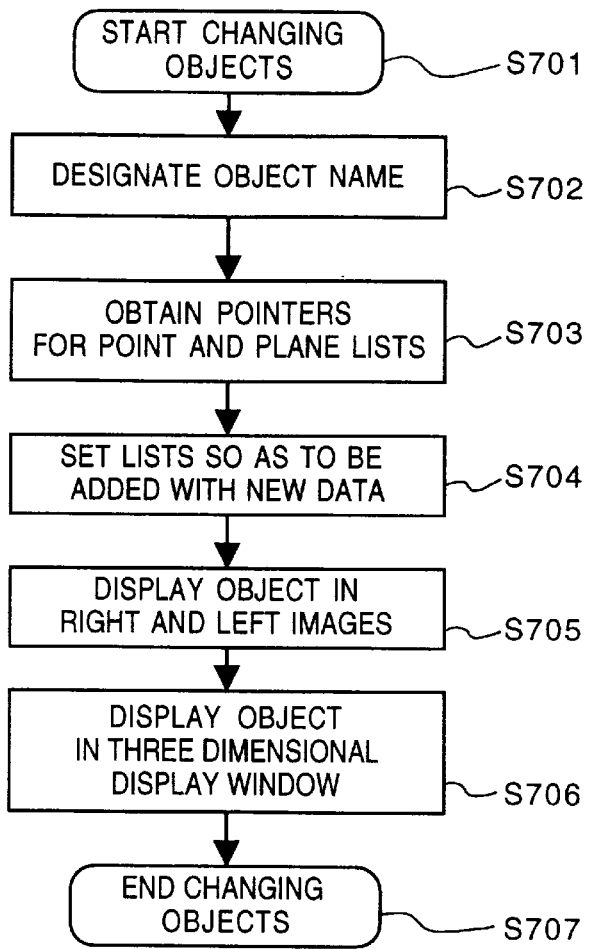
FIG. 8 is a flowchart showing a process to change objects according to the first embodiment.

When "change objects" is selected, a process at step S409 is performed. Detail of this process is shown in FIG. 8.

First, an object name is designated (step S702), then the top address pointers for the point list and the plane list corresponding to the designated object name are read from the table shown in FIG. 7 so that new data of corresponding points and triangles can be added in the point and plane lists (step S703 and step S704). Regarding object designation, a list of objects as shown in FIG. 7 is displayed in another window, and a user designates one of the objects in the list by using the pointing device. At this time, if the object which is currently processed has not been registered, i.e., if steps from S801 to S804 have not been processed for the object, data of the object is deleted. Further, if data of the object is to be saved, the data of the object is saved by setting top address pointers for the point and plane lists and adding an entry to the table in FIG. 7. If the data of the object has been registered, the process to change objects is achieved by simply changing pointers. After changing the pointers, the object which is currently edited is displayed in right and left images so that a user can confirm the images (step S705). Further, the object is also displayed in the three dimensional display window (step S706).

Figure 11:
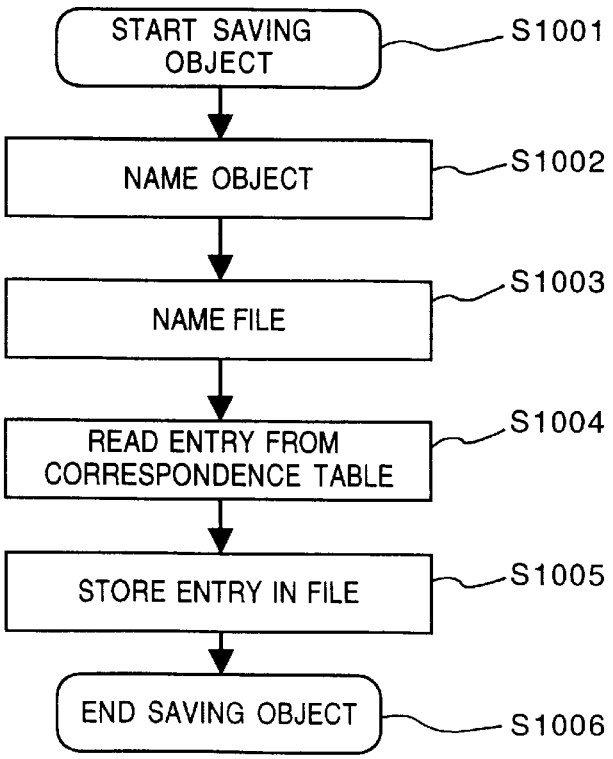
FIG. 11 is a flowchart showing a process to store an object according to the first embodiment.

Whereas, when "save object" is selected in the operation menu 3-1, namely when the process moved from step S414 to step S415, processes shown in a flowchart in FIG. 11 are performed.

In the processes, data of the point list and the plane list are changed to data of a suitable format, and stored in the hard disk 1-2 in a file.

First, an object name and a file name are decided by using the keyboard 1-6 (step S1002 and step S1003), then an entry to a list data corresponding to the object name is read from the table shown in FIG. 7. Afterwards, the list data designated by the entry is stored in some suitable format (step S1004 and step S1006).

Figure 10:
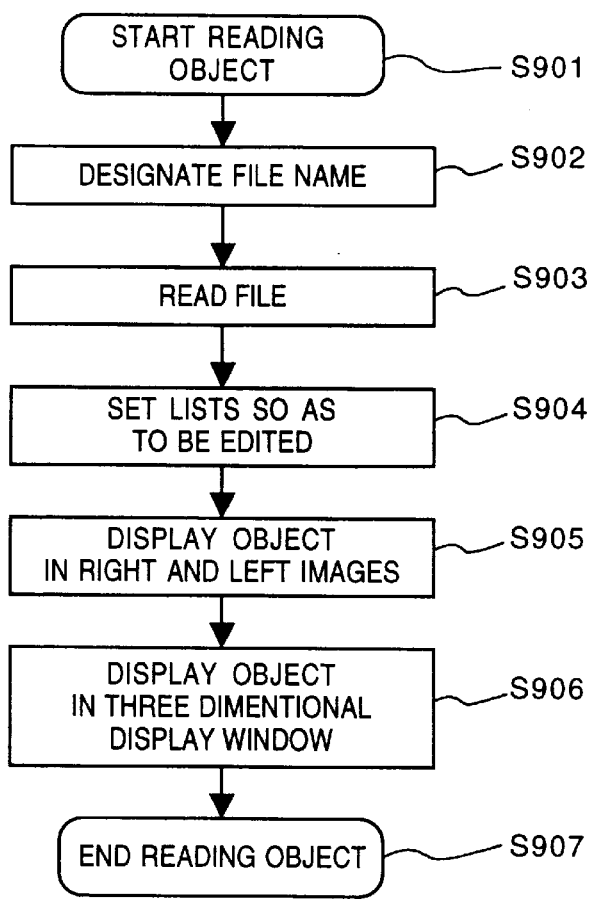
FIG. 10 is a flowchart showing a process to read an object according to the first embodiment.

Further, when "read object" is selected, or the process proceeds from step S412 to step S413, processes shown in a flowchart in FIG. 10 are performed. In the processes, data in the point list and the plane list stored in a file is read.

First, a file name is designated (step S902), and a file having the designated file name is read (step S903). Then, an entry to read data of the point list and the plane list of an object is added to entries under edition (step S904). Thereafter, the object is displayed in right and left images so as to confirm the images (step S905), and also in the three dimensional display window (step S906). New corresponding points can be added to the point list read in this process.

Figure 12:
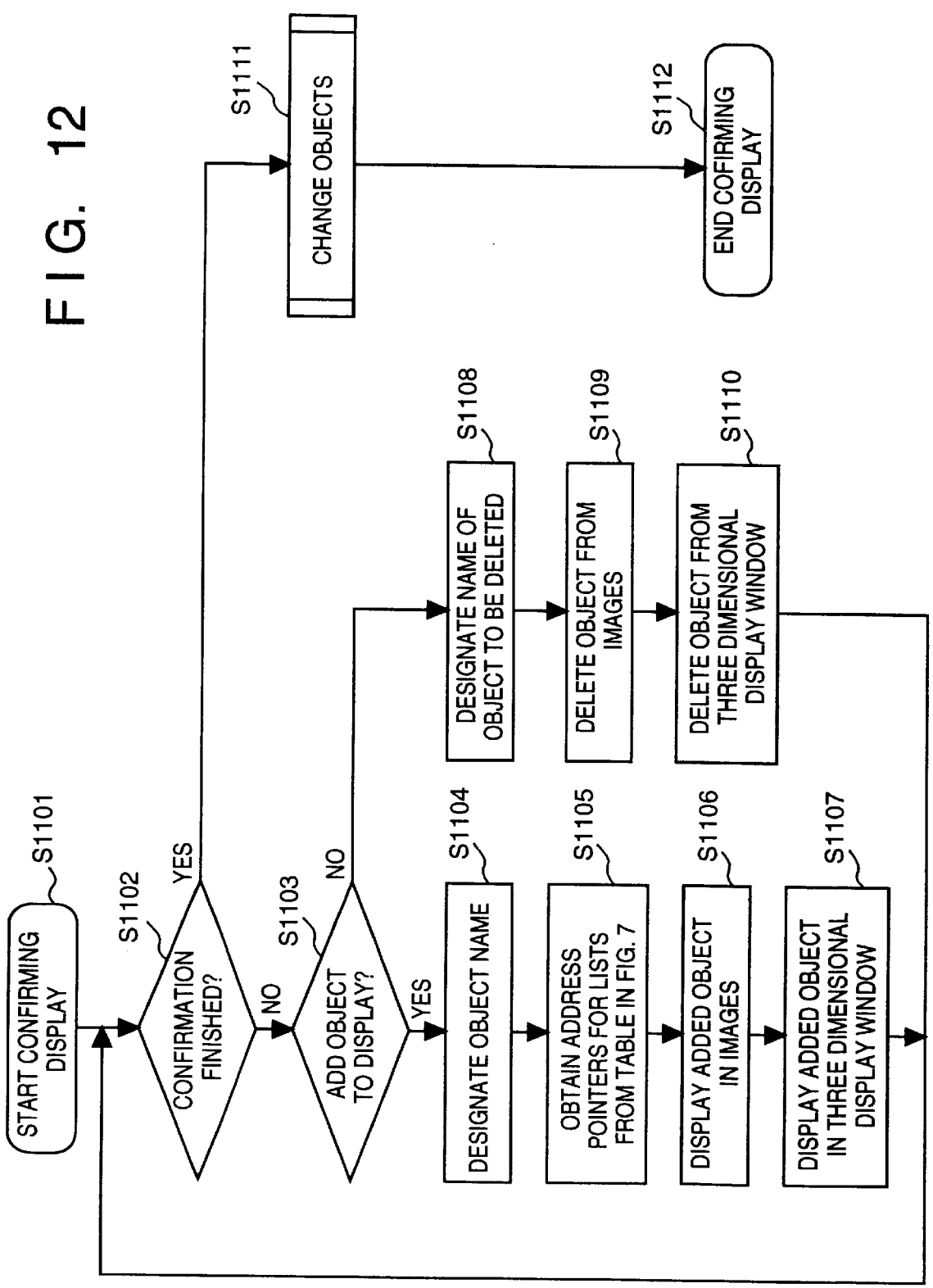
FIG. 12 is a flowchart showing a process to confirm a display according to the first embodiment.

When "confirm display" is selected, or the process proceeds from step S416 to step S417, processes shown in a flowchart in FIG. 12 are performed. In the processes, images is displayed for confirming the registered objects. A plurality of objects can be displayed simultaneously for confirmation.

Then, whether or not display for confirmation is finished is checked. This determination is performed by checking whether a user has designated to quit the process or not.

If it is designated that the process is to be continued (or if an instruction to quit the process is not issued), whether or not there is any object to be additionally displayed is checked (step S1103). If there is, an object name of the additional object is designated (step S1104), then the top address pointers for the point list and the plane list are fetched and set (step S1105). Afterward, the object is added to the right and left images (step S1106) and also to the three dimensional display window (S1107).

Figure 14:
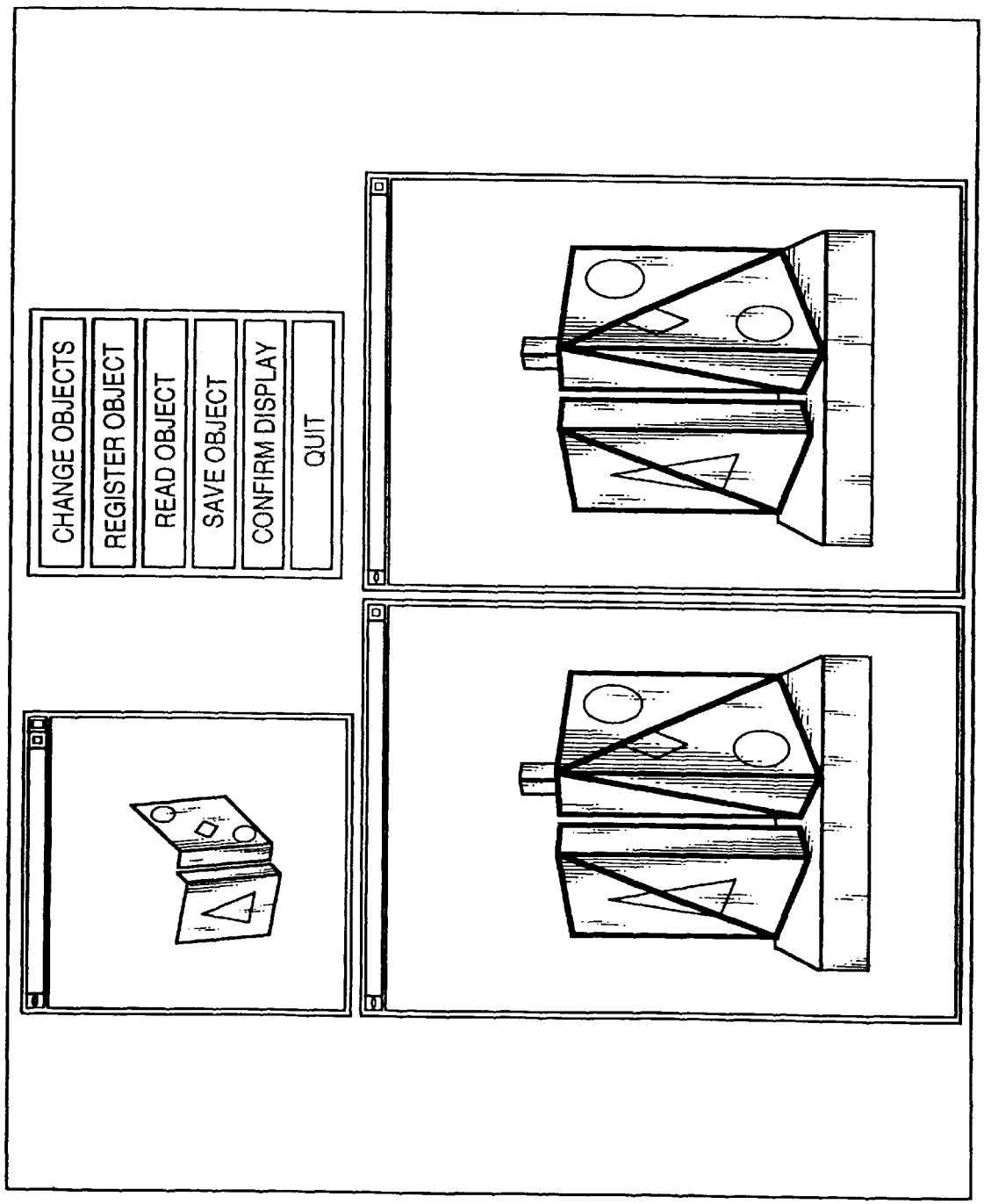
FIG. 14 is a diagram illustrating a display in the middle of edition according to the first embodiment.

If there is an instruction for deleting displayed object (or not addition of display), the process proceeds from step S1103 to step S1108. In this process, the name of an object to be deleted is designated (step S1108), and the object is deleted from the right and left images which are displayed overlaid (step S1109). Further, it is also deleted from the three dimensional display window (step S1110). Thereby it is possible to display combinations of arbitrary objects among a plurality of objects freely. For example, as shown in FIG. 14, it is possible to display selected two objects in the three dimensional display window.

When the end of the process is determined, the process to change objects at the steps S701 to S707 is performed.

Since values of three dimensional coordinates of a plurality of objects registered in the plane list are able to keep relative position relationship among objects, when the plurality of objects are displayed simultaneously, position relationship in the three dimensional space is maintained. This feature gives good effect on texture mapping display in the three dimensional display window. More specifically, different texture information for each object is not necessary, and the same texture information can be used for all the objects.

According to the first embodiment as described above, following advantages can be obtained.

(0) Since texture information is inputted as an image at the same time when the right and left images are inputted, it is possible to perform texture mapping display in three dimension even if the texture information is inputted separately. Especially, when a It is possible to obtain three dimensional shape of an object from the right and left images of a stereoscopic image by providing means for designating corresponding points in right and left images of the stereoscopic image.

(1) It is possible to deal with three dimensional shapes of a plurality of objects separately by providing means for registering and managing the plurality of three dimensional shapes which is included in means for finding three dimensional shape interruptedly from the right and left images of a stereoscopic image when a plurality of objects are included in the images. Accordingly, it is possible to display three dimensional shapes of a plurality of objects separately, store the same in a file, and read the same from a file.

(2) Further, it is possible to display and confirm three dimensional relationship among a plurality of objects simultaneously by providing means for changing data of a plurality of stored three dimensional shapes and for displaying them.

(3) Furthermore, regarding an object having a concave area which can not be dealt with if a plane generation method using the Delaunay triangulation net is employed, the object having the concave area can be dealt with by considering the object as a group of a plurality of separated convex objects.

Therefore, since texture information is inputted as an image, it is possible to perform texture mapping display in three dimension even if the texture information is separately inputted. Especially, when a shape of an object is searched as a group of a plurality of objects, only the single texture information is necessary, or texture information corresponding to each of the plurality of objects is not necessary.

Note that in the first embodiment as described above, as a method for generating triangular patches, to use triangles for generating a plane is most effective to display and to perform calculations fast at a present time. However, there are methods for generating a plane without using triangles, the shape to be used is not limited to triangle, but can be rectangle or the like.

Further, in the first embodiment, the triangular net is generated on the basis of points in two dimensional plane of an image, however, the triangular net can be generated in three dimensional space by using three dimensional coordinates which are obtained at step S424. Regarding a method for generating the triangular net by using points of three dimensional coordinates, there is a method to designate points manually by a pointing device for two or three dimensions. Beside this, there is a method to extend the Delaunay's principle, in which points having closest distances to each other in two or three dimensional space, into three dimensional space, and combination of above two, or can be performed by following some other rules.

Further, not only three dimensional shapes are inputted, but also texture information is inputted simultaneously. Therefore, it is advantageous to perform three dimensional texture mapping display. Three dimensional display means in the first embodiment performs texture mapping by dealing with either one of the right and left images as texture. ps
<Second Embodiment>

In the above-described first embodiment, corresponding points in inputted right and left images of a stereoscopic image are manually designated. If shapes of an object in the images is relatively simple, it is not much trouble to manually designate corresponding points in the images. However, if many corresponding points are necessary to be inputted, the input requires considerable time and energy.

Further, since a user manually operates a pointing device or the like to designate points, it requires some user training in order to designates positions precisely.

The second embodiment is for overcoming the aforesaid problems, and for providing following advantages which are explained along with operations.
1. When a single point which is to be a vertex of a three dimensional geometrical shape model in one of the right and left images of a stereoscopic image is designated, a corresponding point on the other image is searched automatically. Thereby, the number of times to input points is reduced.
2. When a single point which is to be a vertex of a three dimensional geometrical shape model in one of the right and left images and a rough position in the other image corresponding to the vertex are designated, and the rough position is automatically corrected to a position which corresponds to the vertex more precisely. Thereby, it is possible to reduce burden of inputting corresponding points by a user. In addition, corresponding points which corresponds to each other are determined more precisely comparing to the above operation of 1.
3. By displaying marks indicating designated points at designated positions in the right and left images, it is possible for a user to confirm the designated positions. Further, by designating the same positions again, the designated points are canceled freely.
4. By displaying marks to indicate corresponding points in the right and left images, it is possible for a user to confirm the automatically selected corresponding points. Further, by adding a function to cancel corresponding points, it is possible to cancel the automatically selected corresponding points which are mistakenly selected.
5. By switching among the aforesaid operations of 1 and 2 and a mode for manually inputting a pair of corresponding points in the right and left images, if selection of corresponding points by the operation 1 failed, then corresponding points can be searched by the operation 2, for example. Likewise, when selection of corresponding points by the operation 2 failed, then the mode for manually designating corresponding points can be used. Thereby, correct corresponding points can be determined.

Figure 21:
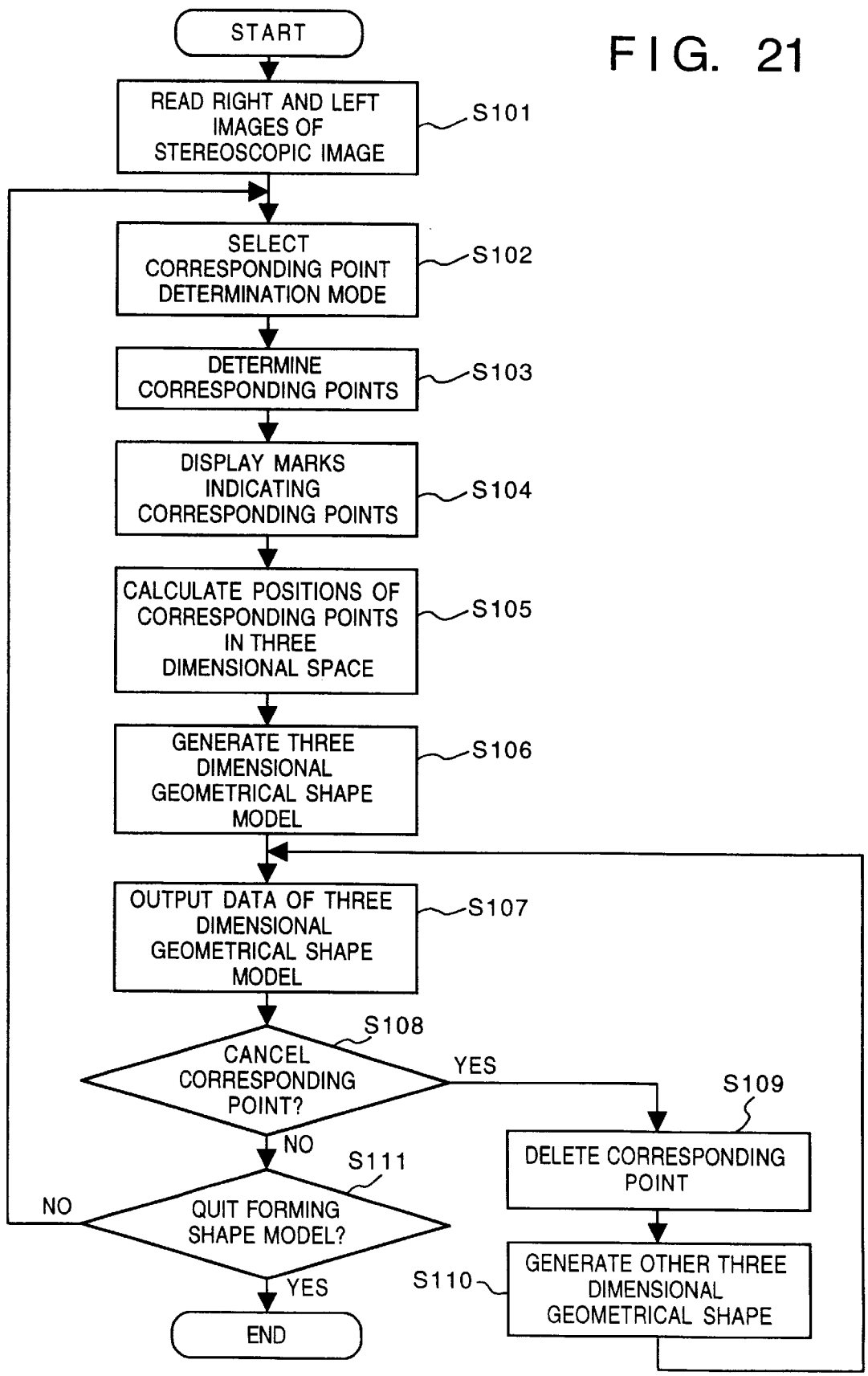
FIG. 21 is a flowchart showing an operational sequence of an entire apparatus according to a second embodiment.
Figure 22:
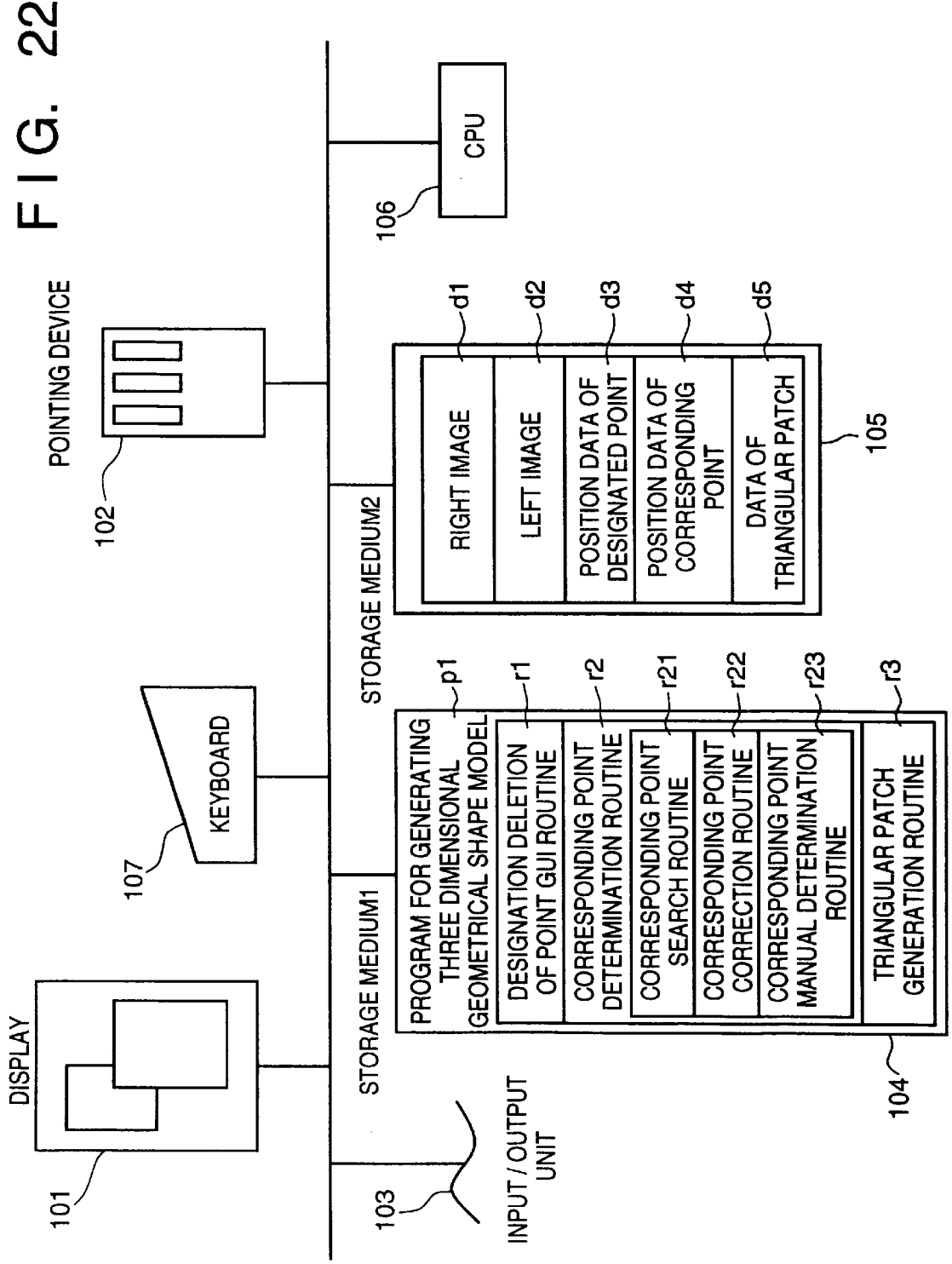
FIG. 22 is a block diagram showing a configuration of an apparatus according to the second embodiment.

FIG. 21 is a flowchart showing processing sequence for generating a three dimensional shape in the second embodiment. FIG. 22 is a block diagram showing a configuration of an apparatus for realizing the aforesaid operations. The detail will be described below referring to the figures. Each consisting element will be described along with the processing sequence.

Right and left images of a stereoscopic image, obtained by sensing objects with two cameras or by sensing objects twice with a single camera at predetermined positions are inputted from an input/output unit 103, shown in FIG. 22, which is used for communicating with an external device. Then, data of the images is stored in a storage medium 105 (consists of RAM). Thereafter, a display 101 displays the images (step S101).

At step S102, a menu window to be used for selecting one out of three corresponding point determination modes, namely a corresponding point search mode, a corresponding point correction mode, and a manual mode, is displayed on the display 101. Then, a user selects one of the above modes by using a keyboard 107 or a pointing device 102.

Next at step S103, a pair of corresponding points in the right and left images are determined (this determination process will be described later with reference to a flowchart shown in FIG. 23.) At step S104, marks indicating corresponding points are displayed at positions of the corresponding points determined at step S103 in the right and left images. At step S105, the positions of the determined corresponding points in the three dimensional space are calculated by using triangulation theory with reference to position data of the corresponding points.

Next at step S106, by using the points in the three dimensional space obtained at step S105 as vertices of a shape model, a three dimensional shape model of the object is generated. Data of the generated three dimensional geometrical shape model is sent to the input/output unit shown in FIG. 22 at step S107. Then, triangular patches of the shape model are displayed in the right and left images on the display 101.

When it is instructed that some of the determined corresponding points are to be canceled at step S108, corresponding points to be canceled stop being displayed in the right and left images at step S109. At the same time, data related to these corresponding points is deleted. Further, other three dimensional geometrical shape model is generated by using any generation method at step S110.

Whereas, if there is no designation to cancel corresponding points having been determined at step S108, then the process proceeds to step S111.

At step S111, it is determined whether or not the aforesaid processes S102 to S108 are repeated until an instruction for quitting generating the shape model is issued.

Next, contents of step S103 in FIG. 21 will be described by following a flowchart in FIG. 23. First, at step S301 in FIG. 23, a point to be a vertex of a three dimensional geometrical shape model is manually designated in either a displayed right or left image by using a pointing device 102. The point designated at step S301 is called "point A", an image in which the point A exists is called "image If", and the other image is called "image Is", hereinafter.

At step S302, a mark indicating the designated point is displayed at the position of the point A in the image If. When it is instructed that the designated point A is to be canceled at step S303, then the mark indicating the designated point A stops being displayed and position data of the designated point A is deleted at step S304. Whereas, if there is no instruction to cancel the designated point A, then the process moves to step S305.

At step S305, it is checked whether or not the corresponding point determination mode is set to the manual mode is determined (selection of mode is performed at step S102 in FIG. 21). If it is determined that the manual mode is set, the cursor which moves under the control of the pointing device 102 is displaced to a desired position in the image Is and a button on the pointing device is pressed, thereby a point in the image Is is manually designated. The point designated at step S307 is called "point Bm", hereinafter. At step S308, a pair of points, A and Bm are determined as corresponding points.

Whereas, if the corresponding point determination mode is not set to a manual mode at step S305, the process moves to step S309 where it is checked whether or not the corresponding point determination mode is set to the corresponding point search mode.

If it is, the process proceeds to step S310, and a point in the image Is corresponding to the point A is automatically searched, then the searched point is determined as the corresponding point to the point A. The process at step S310 will be described later in detail referring to FIG. 24.

Further, if the corresponding point determination mode is not set to the corresponding point search mode at step S309, or it is determined that the corresponding point determination mode is set to the corresponding point correction mode, then the process proceeds to step S311. At step S311, after moving the cursor in the image Is by operating the pointing device 102, a rough position corresponding to the point A is manually designated by using the pointing device 102 at step S312. The point designated at step S312 is called "point BC", hereinafter. The position of the point BC is corrected so as to precisely correspond to the position of the point A at step S313, thereby determining the corrected point BC as the corresponding point to the point A. The process at step S313 will be described later in detail referring to FIG. 25.

The position data of the corresponding points determined at either step S308, S310, or S313, as described above, is outputted from the input/output unit 103 in FIG. 22 at step S314.

Next, the corresponding point search process at step S310 is described with reference to FIG. 24. It is assumed that the image data is expressed as a set of density values of the three primary colors (red, green, blue) at a lattice point arranged discretely, namely at a pixel. Correlation c is defined by an equation described below, when a point in the left image is P1 and a point in the right image is Pr.

$$c = \sum_{Q=R,G,B} \sum_{x=1}^{X} \sum_{y=1}^{Y} \frac{(L_Q(x, y) - \bar{l})(R_Q(x, y) - \bar{r})}{\sqrt{l_\sigma \cdot r_\sigma}} \quad (1)$$

In above equation (1), $L_Q(x, y)$ and $R_Q(x, y)$ denote density values of pixels at coordinates (x, y) in parts of images whose size are X×Y pixels having centers as the point P1 and the point Pr, respectively. Further, Q denotes each color component of RGB of a color image. Variables in the equation 1 are defined as follow.

$$\bar{l} = \frac{1}{3 \cdot X \cdot Y} \sum_{Q=R,G,B} \sum_{x=1}^{X} \sum_{y=1}^{Y} L_Q(x, y) \quad (2)$$

$$\bar{r} = \frac{1}{3 \cdot X \cdot Y} \sum_{Q=R,G,B} \sum_{x=1}^{X} \sum_{y=1}^{Y} R_Q(x, y) \quad (3)$$

$$l_\sigma = \sum_{Q=R,G,B} \sum_{x=1}^{X} \sum_{y=1}^{Y} (L_Q(x, y) - \bar{l})^2 \quad (4)$$

$$r_\sigma = \sum_{Q=R,G,B} \sum_{x=1}^{X} \sum_{y=1}^{Y} (R_Q(x, y) - \bar{r})^2 \quad (5)$$

Figure 24:
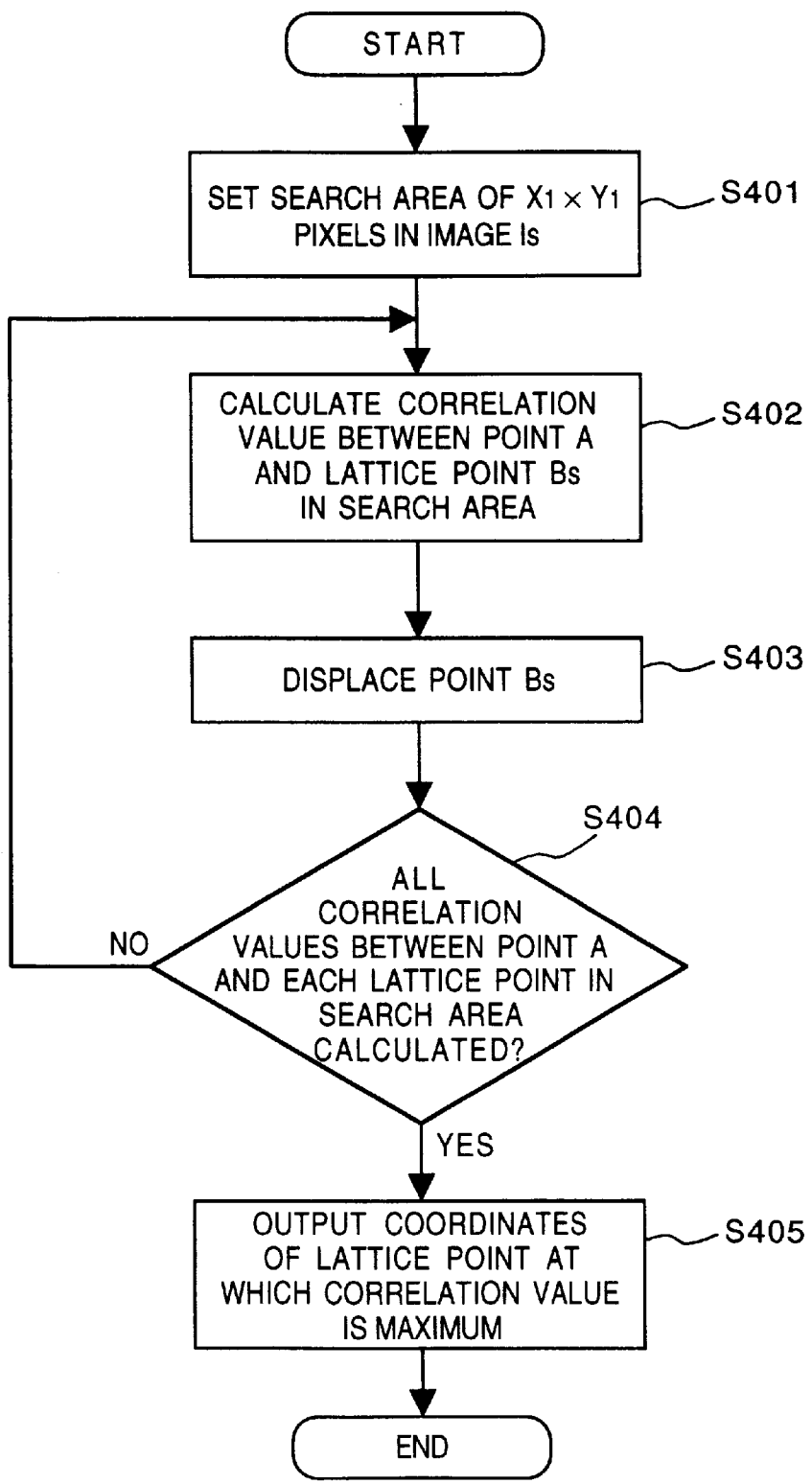
FIG. 24 is a flowchart showing a corresponding point search process according to the second embodiment.

At step S401 in FIG. 24, an area of X1×Y1 pixels is selected in the image Is and dealt with as a search area. Then, a correlation value between the point A and a lattice point Bs in the search area is calculated at step S402. At step S403, the point Bs is displaced to other lattice point in the search area. The processes at step S402 and S403 are repeated until it is determined at step S404 that all the correlation values between the point A and each lattice point in the search area are calculated. When all the correlation values between the point A and each lattice point have been calculated, coordinates of a lattice point at which the correlation value between the point A and the lattice point is maximum is outputted at step S405, and the process is completed.

Figure 25:
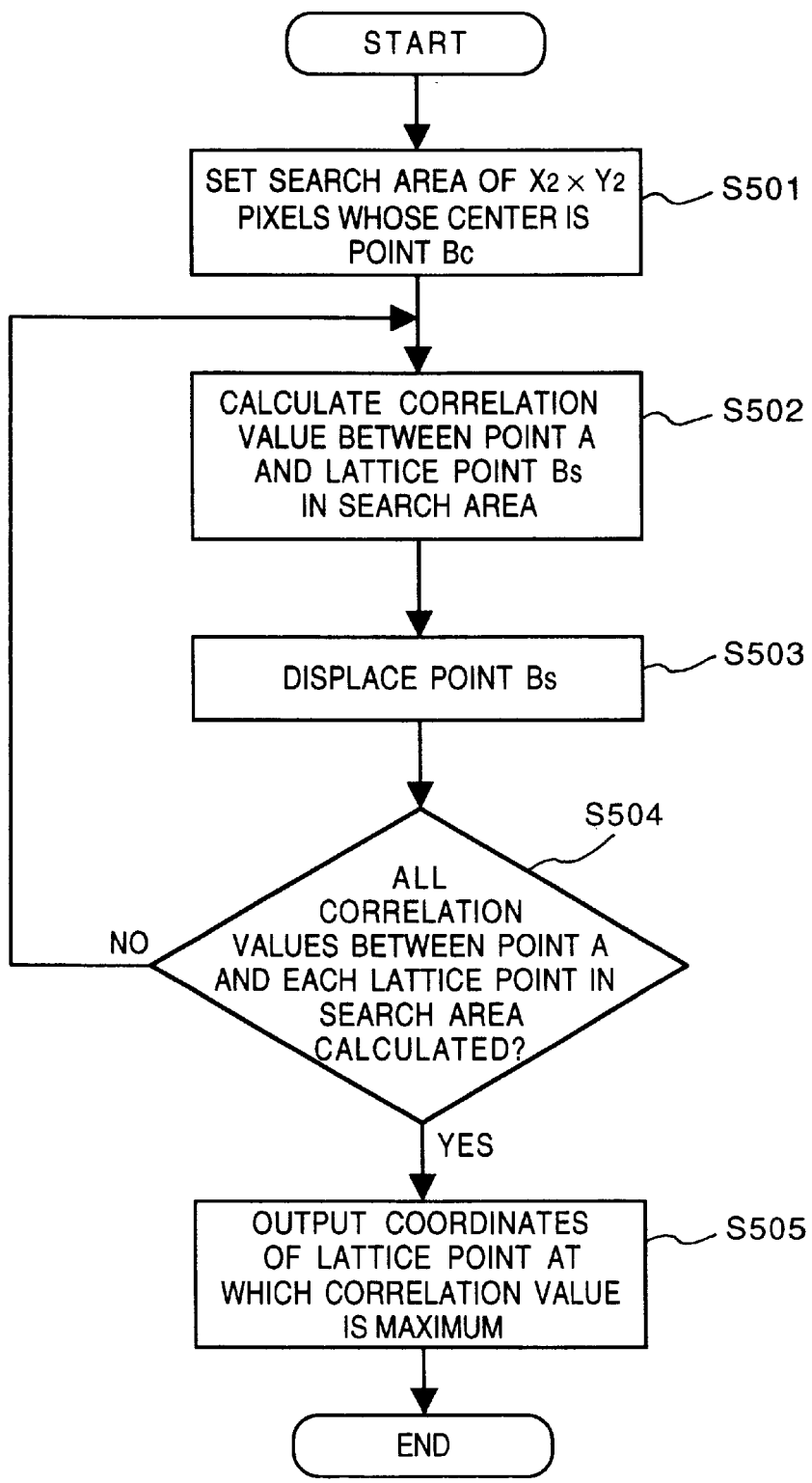
FIG. 25 is a flowchart showing a corresponding point correction process according to the second embodiment.

Next, the corresponding point correction process at step S313 is explained below with reference to FIG. 25. At step S501 in FIG. 25, an area of X2×Y2 pixels, having the point BC as a center, is selected in the image Is and dealt with as a search area. Then, a correlation value between the point A and a lattice point Bs in the search area is calculated at step S502. The correlation is defined by using the same equations as the equations (1) to (5). At step S503, the point Bs is displaced to another lattice point in the search area. The processes at step S502 and S503 are repeated until it is determined at step S504 that all the correlation values between the point A and each lattice point in the search area are calculated. When all the correlation values between the point A and each lattice point have been calculated, coordinates of a lattice point at which the correlation value between the point A and the lattice point is maximum is outputted at step S505, and the process is completed. Since the search area in the corresponding point correction process is smaller than the search area defined in the corresponding point search process, the corresponding point to the point A can be determined faster.

Figure 23:
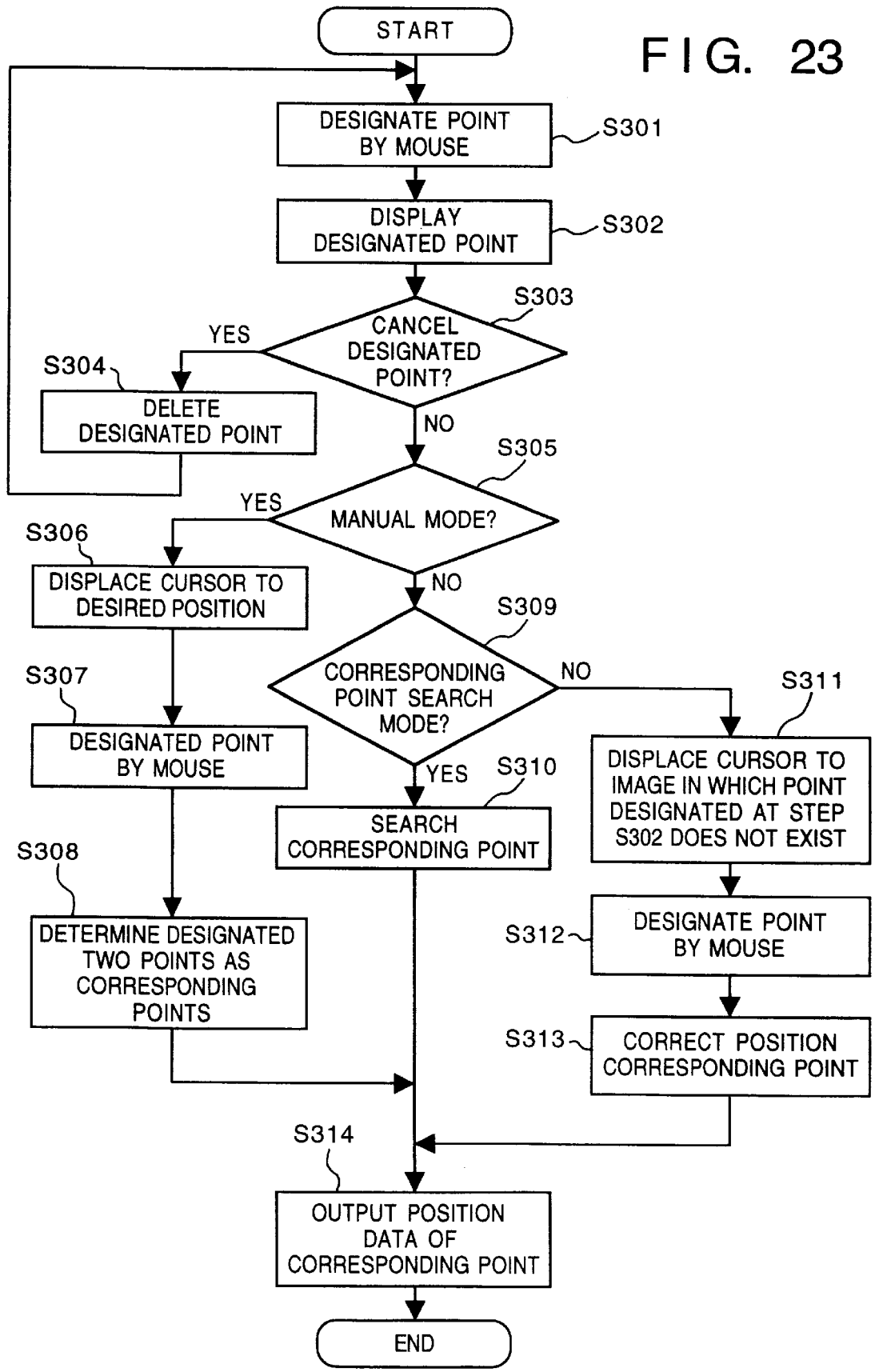
FIG. 23 is a flowchart showing a corresponding point determination process according to the second embodiment.
Figure 26:
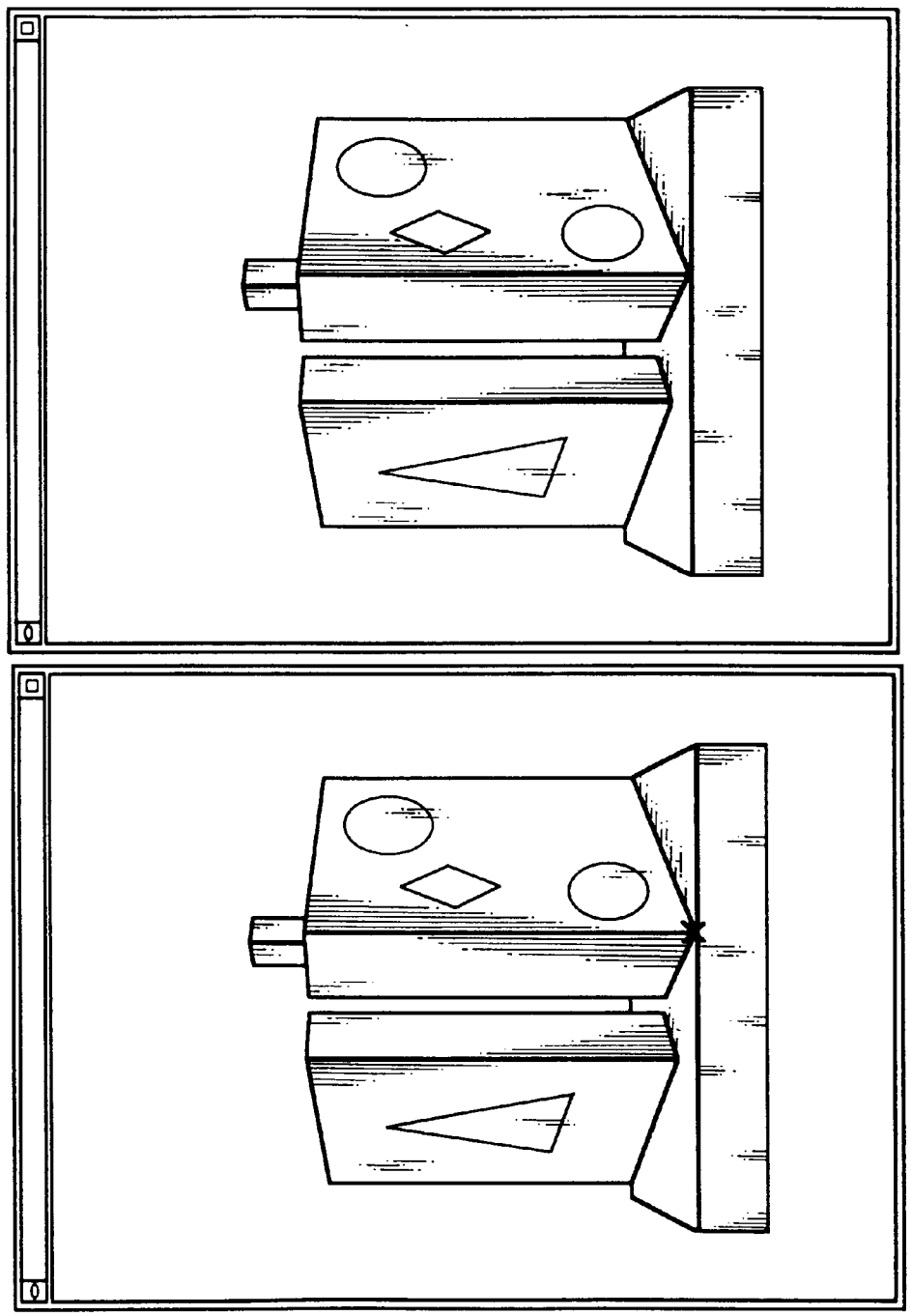
FIG. 26 shows diagrams illustrating a display when a point is designated in a corresponding point search mode according to the second embodiment.
Figure 27:
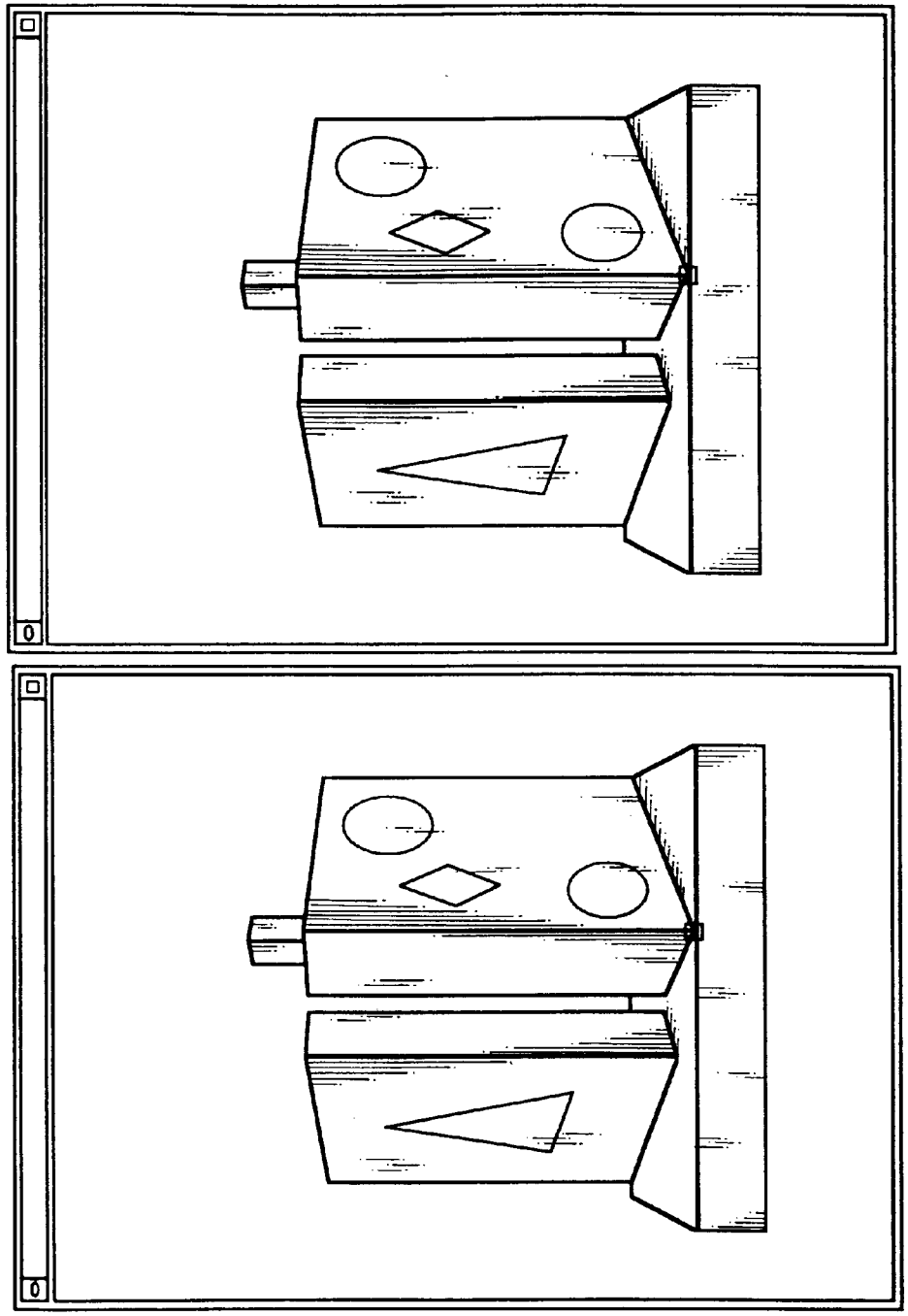
FIG. 27 shows diagrams illustrating a display showing a result of a process in the corresponding point search mode according to the second embodiment.

FIG. 26 is an example when a mark "x" is displayed at the point designated at step S301 in FIG. 23 in the left image, and FIG. 27 is an example when marks "□" are displayed at positions of the corresponding points determined by the corresponding point search process in right and left images.

Figure 28:
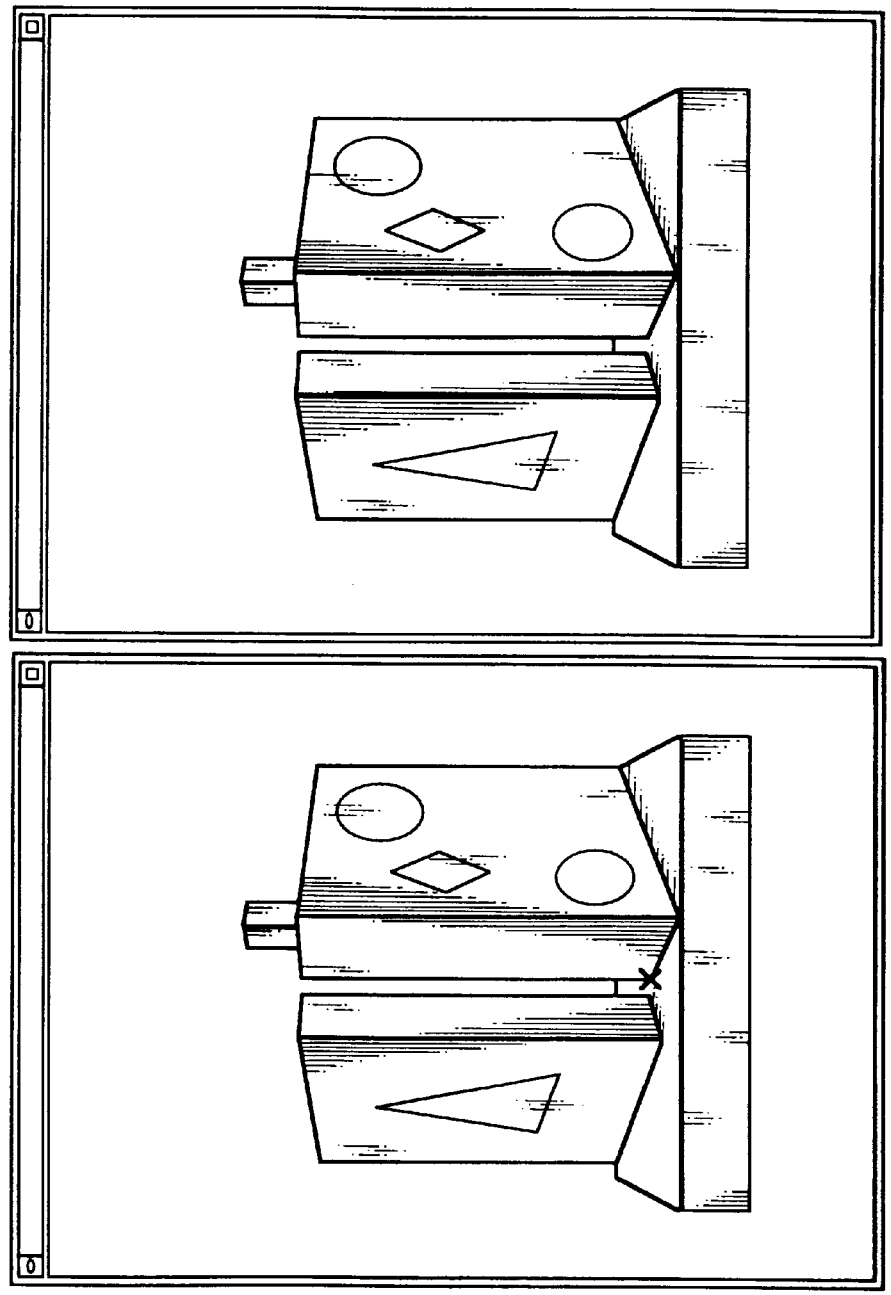
FIG. 28 shows diagrams illustrating a display when points are designated in a corresponding point correction mode according to the second embodiment.
Figure 29:
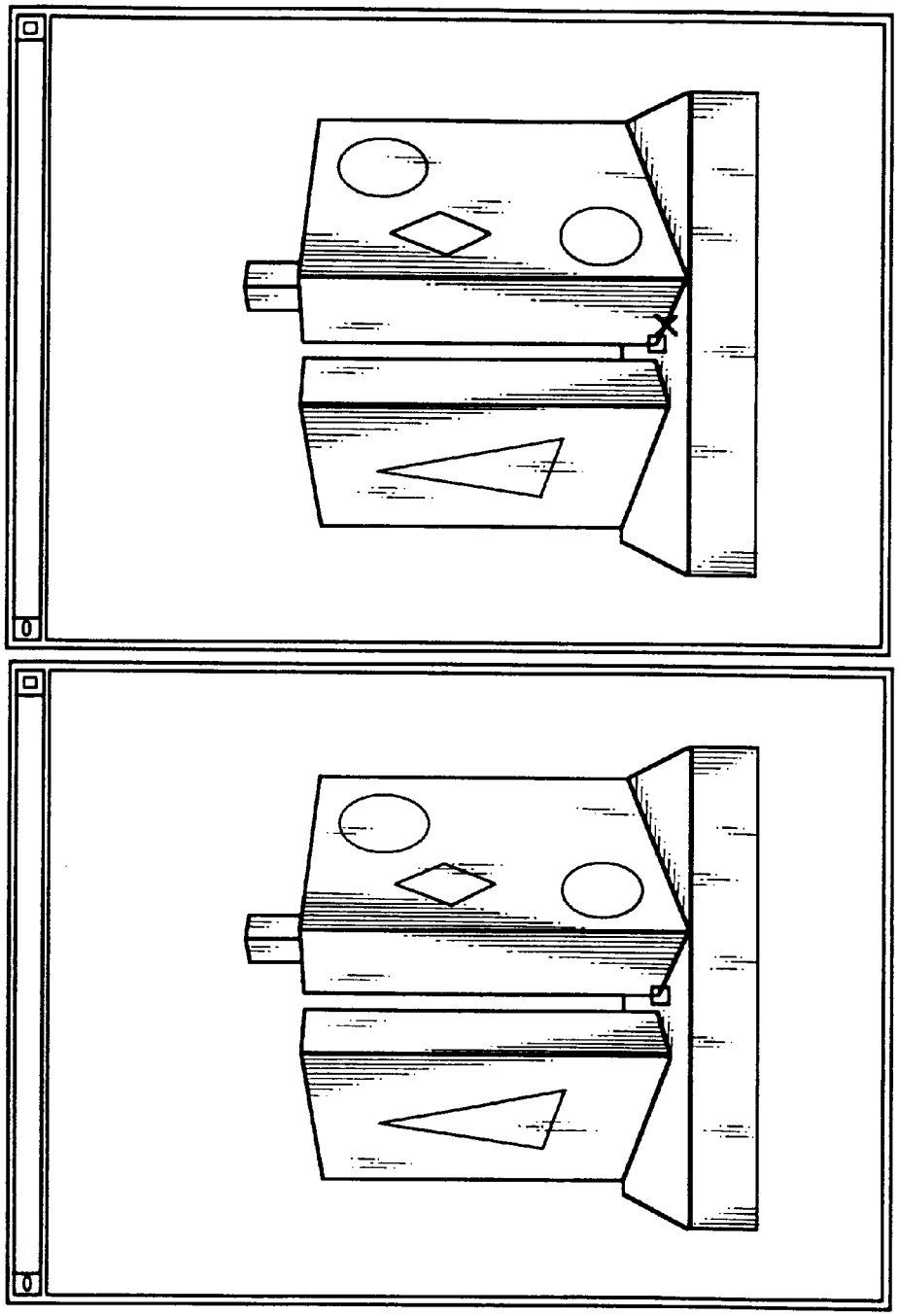
FIG. 29 shows diagrams illustrating a display showing a result of a process in the corresponding point correction mode according to the second embodiment.
Figure 30:
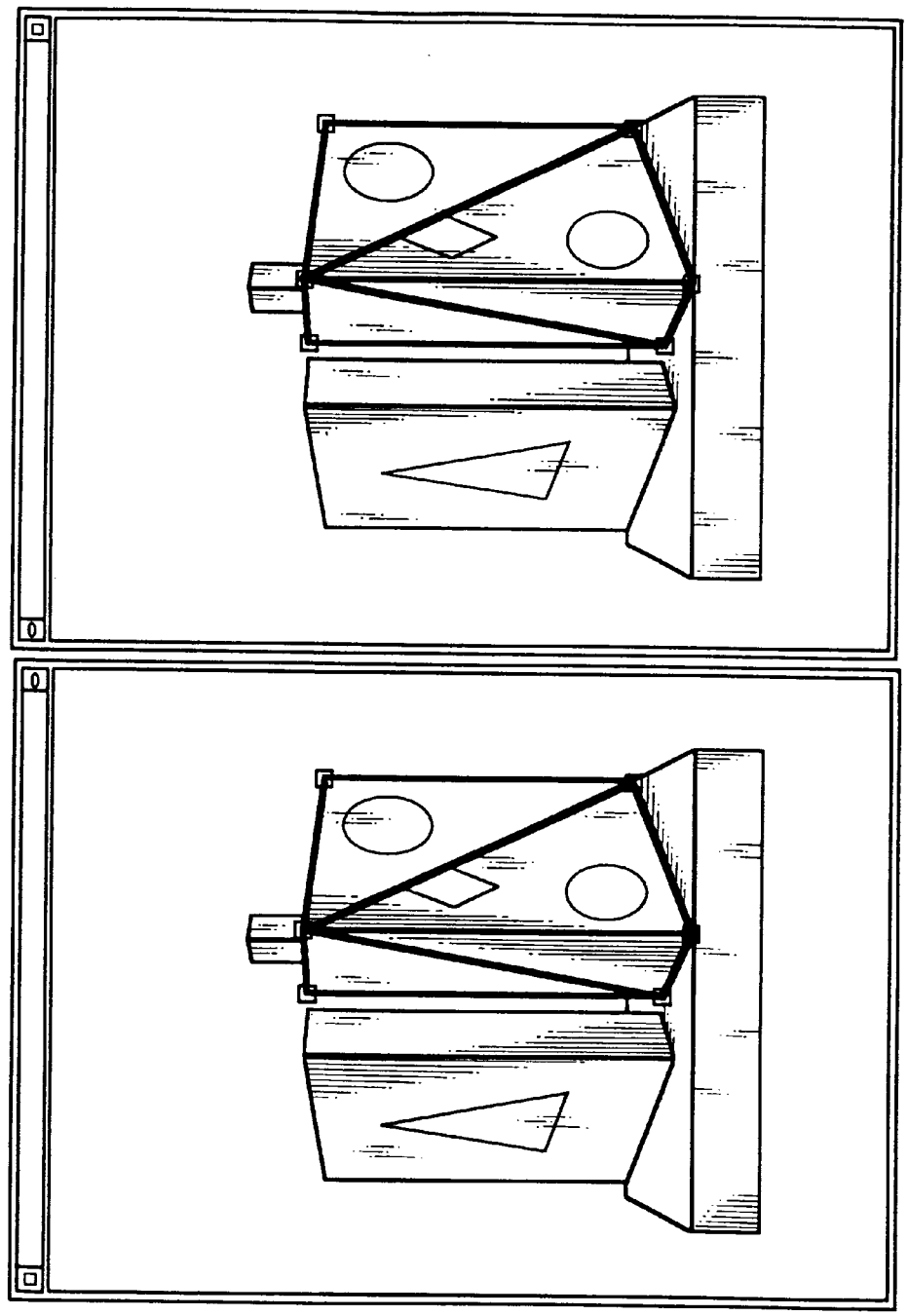
FIG. 30 shows examples for generating three dimensional geometrical shape models according to the second embodiment.

Further, FIG. 28 is an example when "x" is displayed at the point designated at step S301 in FIG. 23 in the left image, FIG. 29 is an example when "x" is displayed at the point designated at step S312 in FIG. 23 in the right image and "□" are displayed at positions of the corresponding points determined in the corresponding point correction process in right and left images. Furthermore, FIG. 30 is an example when triangular patches of a shape model is displayed on the right and left images.

<Third Embodiment>

A third embodiment will be described below.

In the first and second embodiments as described above, it is difficult to determine corresponding points in an area where clear texture or characteristic points do not exists, such as an area having uniform density and an area where tone changes gradually, in the right and left images. In such a case, corresponding points are determined by using a supplementary line or lines in the images in the third embodiment.

Figure 16:
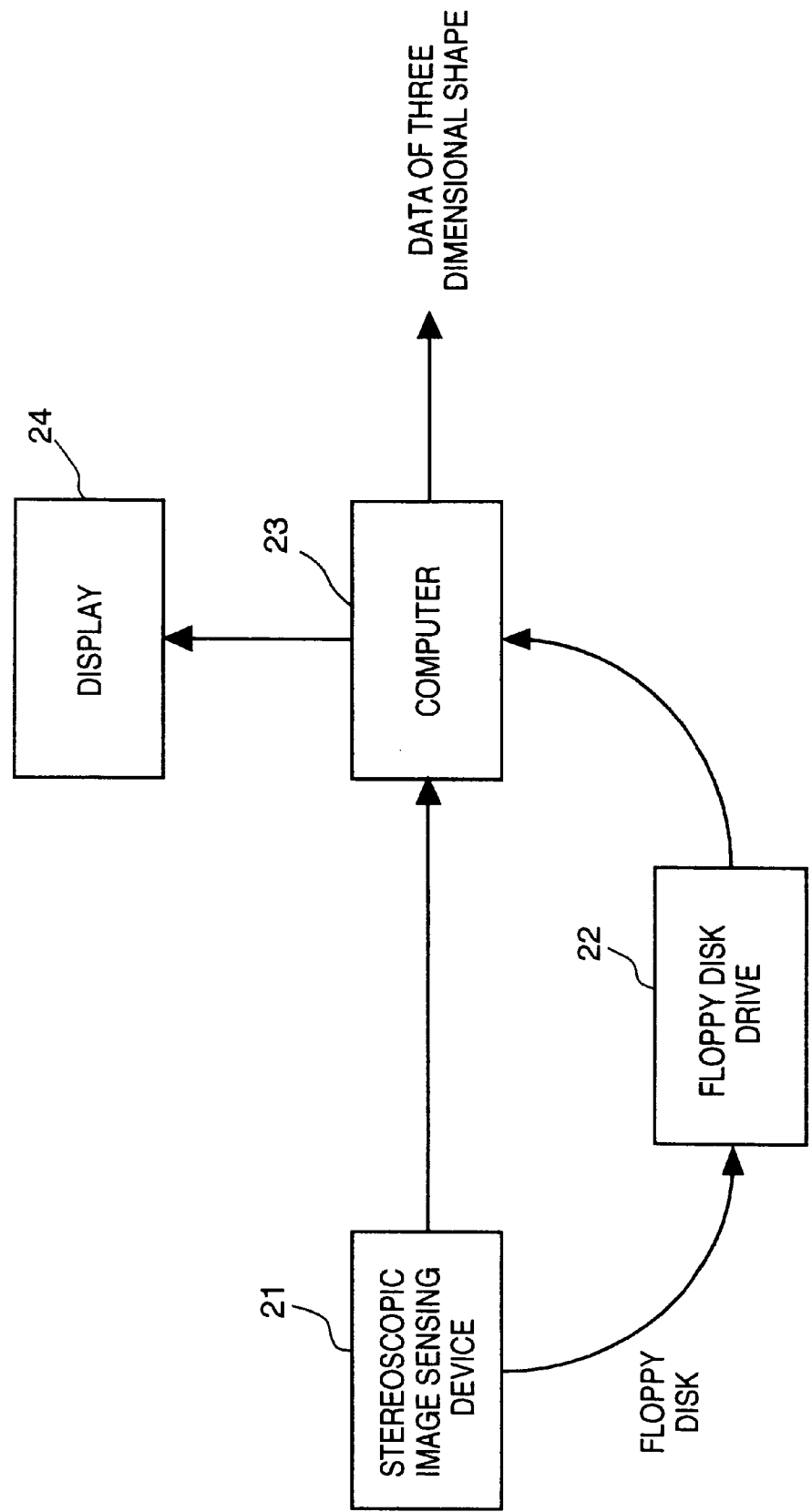
FIG. 16 is a block diagram showing a configuration of an apparatus according to the third embodiment.

FIG. 16 is a block diagram showing a configuration of an apparatus of the third embodiment. In FIG. 16, reference numeral 21 denotes a stereoscopic image sensing device, and CCD cameras and still video cameras can be used as the one. Sensed right and left images of a stereoscopic image are directly sent to a computer 23 as digital image data or stored in a floppy disk and inputted into the computer 23 via a floppy disk drive 22 Then, the input right and left images are applied with various kinds of processes in the computer 23, thereby obtaining three dimensional shape and its position of the right and left images. An image which is expected to be seen from an arbitrary view point is generated on the basis of the obtained three dimensional shape and displayed on a display 24. Further, data of the obtained three dimensional shape is store in a file and can be transferred to an external system, such as CAD or CG. The computer 23 comprises input device, such as a keyboard and a pointing device (a mouse in this embodiment), a hard disk, a floppy disk drive, VRAM used for displaying an image on the display 24, CPU necessary for controlling the computer, RAM, and ROM.

Figure 17:
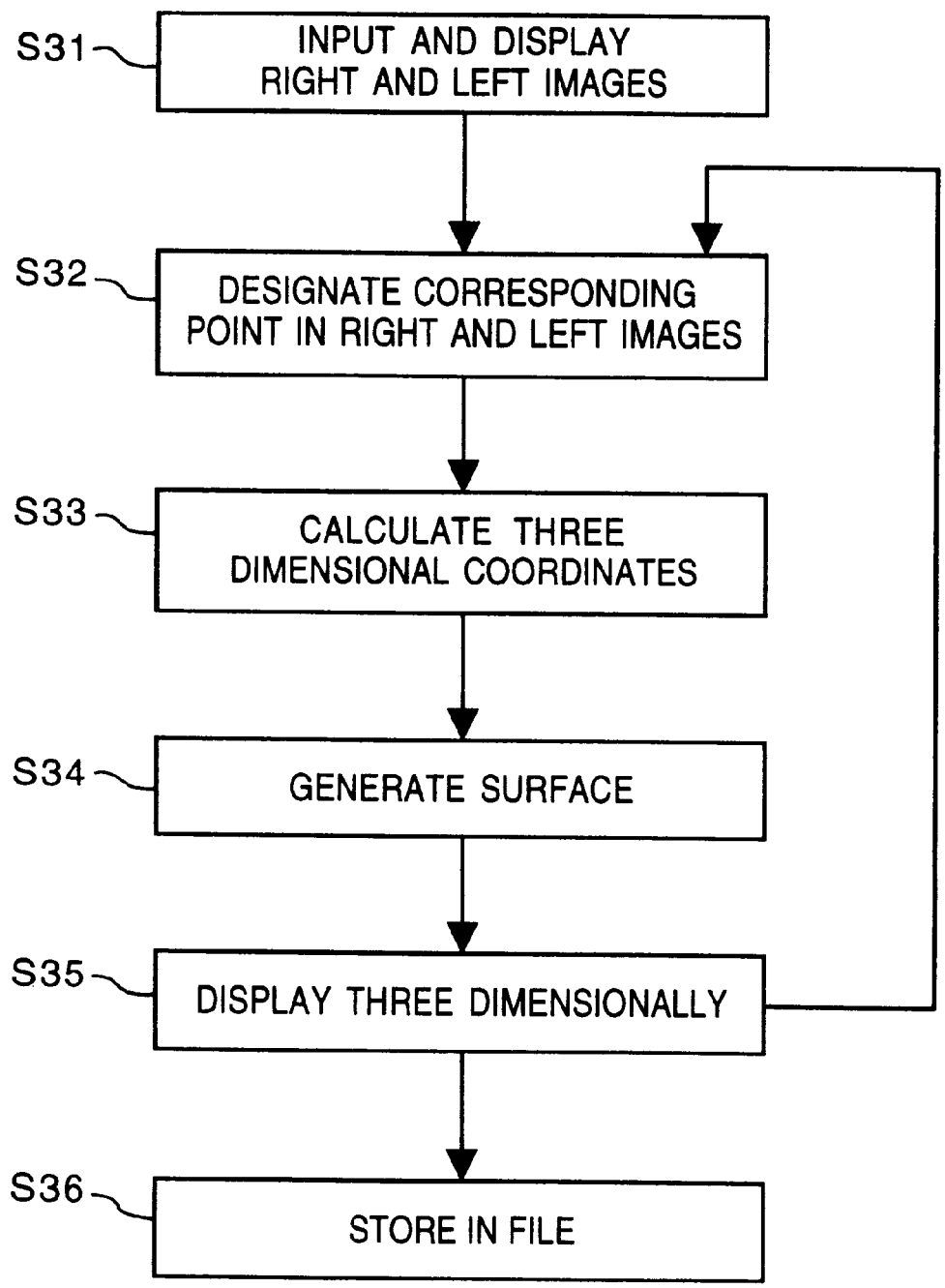
FIG. 17 is a flowchart showing an operational sequence according to the third embodiment.

FIG. 17 is a flowchart showing an operational sequence in the computer 23.

First, right and left images of a stereoscopic image are inputted and displayed on the display 24 (step S31). Next, corresponding points in the right and left images are designated by using a mouse or the like (step S32). On the basis of positions of the designated corresponding points in the right and left images, positions of the corresponding points in the three dimensional space are calculated (step S33). By connecting the points obtained as above, surfaces of an object of interest is determined (step S34). Then, each obtained surface of the object is sequentially displayed on the display 24 (step S35). By repeating aforesaid processes, more precise three dimensional shape of the object is updated. The data of the shape obtained at last is saved in a file (step S36), thereby the data can be added, edited, or sent to other systems, such as CAD and CG.

In the corresponding point designating process at step S32, since the point P1 and P1' shown in right and left images in FIG. 18 are corresponding points, a user designates each of these points in each image by using a pointing device or the like. Similarly, by designating points P2 and P2', P3 and P3', P4 and P4' as corresponding points, data of shape including a position of a surface S1 of the object in the three dimensional space is obtained. Likewise, data of surfaces S2 and S3 is also obtained. It should be noted that, as a method for obtaining data for a shape, the method described in the first embodiment is applied.

Here, right and left images of a stereoscopic image shown in FIG. 19 is considered. In this case, since one of vertices in the surface S1 is hid behind, it is impossible to obtain data of shape of the surface S1. Further, floor on which boxes are on does not have any characteristics, thus data of shape of the floor can not be obtained.

Accordingly, in the third embodiment, supplementary line or lines are drawn in the displayed right and left images by using a graphical user interface. A method for drawing a supplementary line is described below with reference to FIG. 20.

Figure 20B:
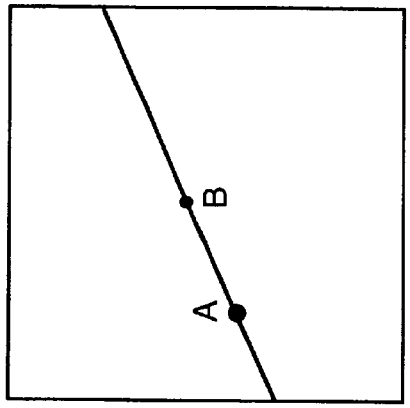
FIGS. 20(a) to 20(d) are diagrams illustrating a method for designating supplementary lines according to the third embodiment.
Figure 20D:
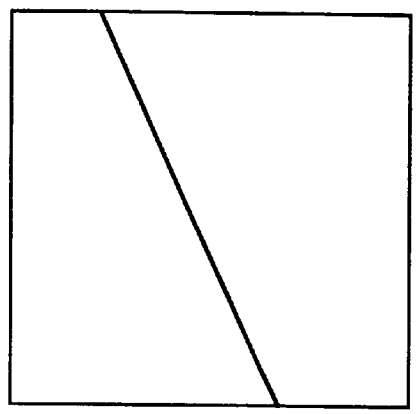
Figure 20A:
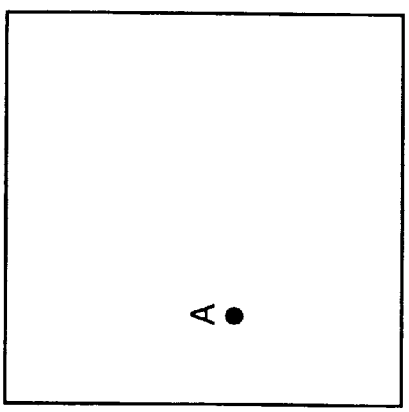
Figure 20C:
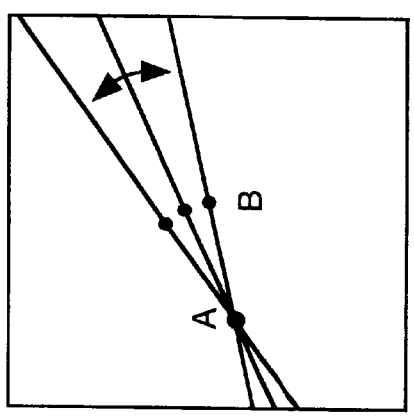

First, press a button of a mouse when a cursor is placed at a position A, in either the right or left image, which a straight line is to pass through (FIG. 20(a)). Then, keep pressing the button of the mouse, and move the cursor to other position B (this operation is generally called "drag"). Along with the displacement of the cursor, a straight line passing through the positions A and B is drawn in the image (FIG. 20(b)). By displacing the position B with keeping the button pressed, a slope of a straight line can be drawn while watching the straight line displayed in the image (FIG. 20(c)). When the button is released, a straight line is determined and displayed in the image (FIG. 20(d)). As described above, with one operation of a mouse, an arbitrary straight line can be drawn interruptedly while watching a straight line in the image.

The feature of the third embodiment is to set a characteristic point in the occluded portion in the input right and left images. The process is described with reference to FIG. 15.

FIG. 15 shows the right and left images after several supplementary lines are drawn in the right and left images shown in FIG. 19. In FIG. 15, the supplementary lines are expressed by broken lines. As seen from FIG. 15, a position of a vertex P1 which is occluded is obtained from an intersection of supplementary lines L1 and L2. By performing the same process in each image for a stereoscopic image, it becomes possible to determine that the vertex P1 in the left image corresponds to the vertex P1' in the right image, thereby data of shape of the surface S1 is obtained.

Similarly, points P2 to P5 on the floor can be obtained from intersections of supplementary lines L1 to L5. Here, the point P2, P3 and P5 are obtained as the intersections between the supplementary lines, and the point P4 is obtained as the intersection between the supplementary line and a line originally included in the images. As a result, data of shape of a partial surface S2 (surface including vertices P2, P3, P4, and P5, and expressed with dot-dash-lines) in the floor can be obtained.

As described above, right and left images of a stereoscopic image inputted to a computer are displayed on a display, and supplementary lines are drawn in the displayed right and left images by using a graphical user interface. Further, intersections among the supplementary lines and straight lines or curved lines originally included in the right and left images and intersections among the supplementary lines are used as corresponding points. Accordingly, it is possible to obtain corresponding points on a characterless plane (e.g. no pattern on the plane), thereby three dimensional shape of the object can be obtained. Further, regarding occluded vertices, their positions can be conjectured and used as corresponding points.

Therefore, on the basis of thus obtained right and left images, new right and left images which are supposed to be seen from a different view point can be generated.

In the third embodiment, a supplementary line is drawn by designating a point which the line passes through, however, any method for drawing a line on the display can be used. For example, a supplementary line can be drawn by designating two arbitrary points in the images which the line passes through.

Further, in the third embodiment, corresponding points in the right and left images are determined manually by a user. However, a computer can automatically determine corresponding points by performing so called stereo matching by using right and left images in which supplementary lines are drawn.

Furthermore, in the above explanation of the third embodiment, straight lines are used as supplementary lines. If positions of occluded points can be determined by using straight supplementary lines, it is better to use them in order to reduce difficulties and processing time by a user and CPU. However, if necessary, positions of occluded points can be determined by using an arc of a circle or other curved line or lines.

<Fourth Embodiment>

Figure 31:
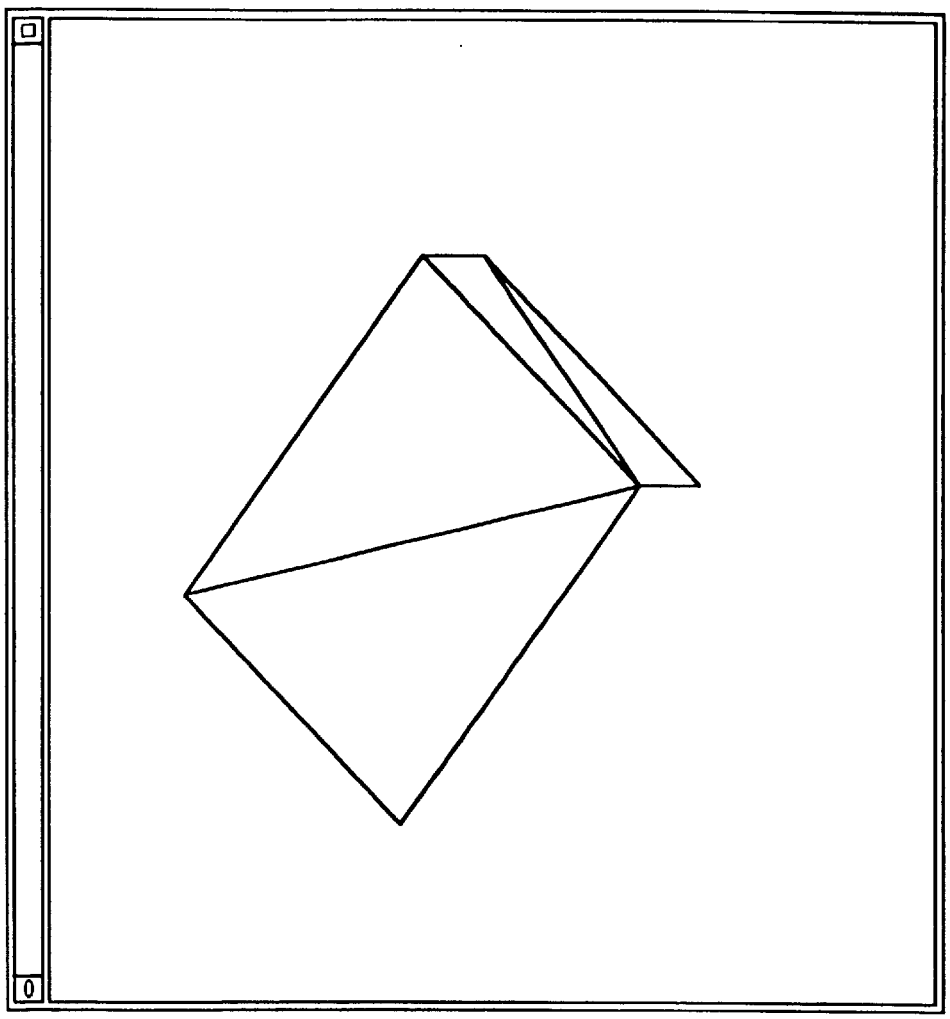
FIG. 31 is a diagram illustrating an example of a three dimensional geometrical shape model expressed by a wire frame.
Figure 32:
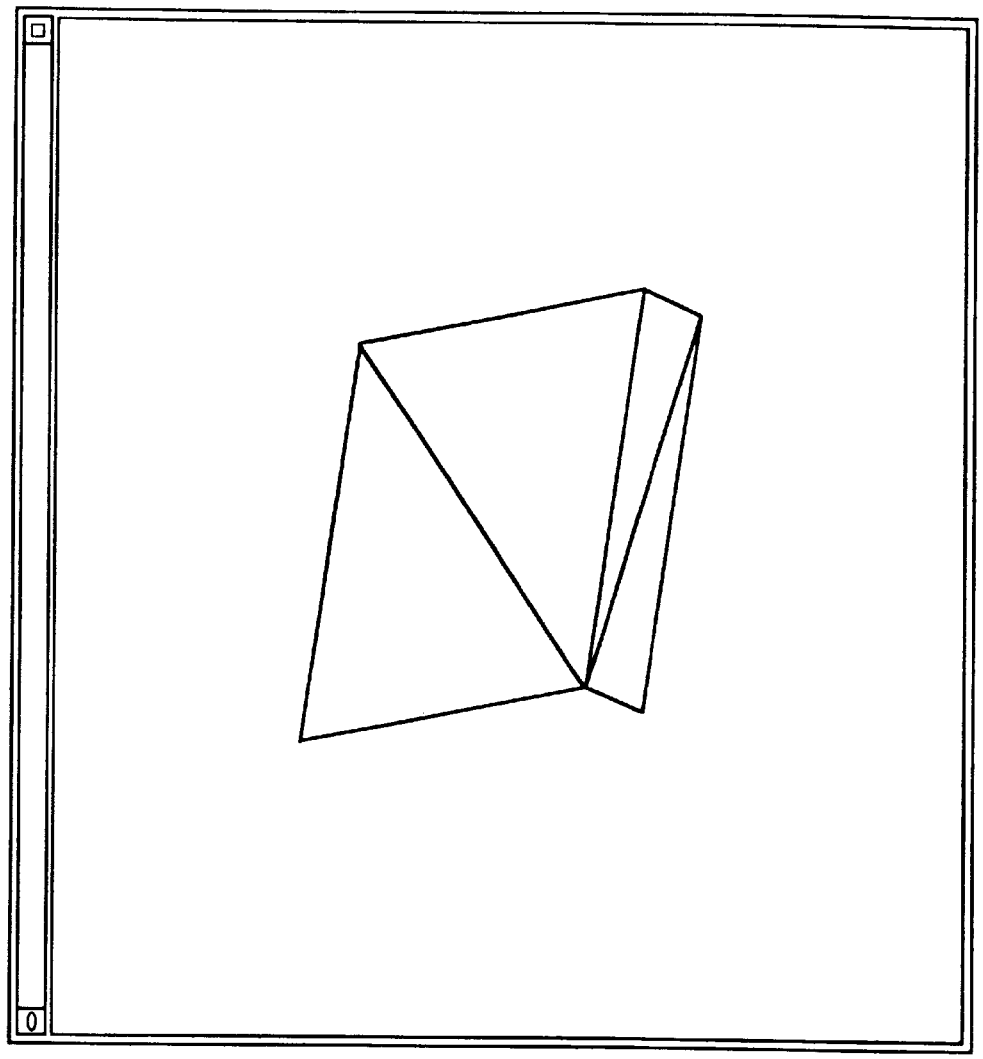
FIG. 32 is a diagram illustrating an example of a three dimensional geometrical shape model expressed by a wire frame.

In the third embodiment, it is possible to confirm positions of corresponding points in right and left images of a stereoscopic image. According to a fourth embodiment, it is possible to confirm a shape of a model three dimensionally by providing a function to display triangular patches of a three dimensional geometrical shape model seen from a certain view point on the display 101 and a function to change directions of view point. FIG. 31 is an example of triangular patches of a three dimensional geometrical shape model, and FIG. 32 is an example of triangular patches of a three dimensional geometrical shape model seen from different view point from that in FIG. 31.

<Fifth Embodiment>

Regarding a function for displaying three dimensional geometrical shape model in the forth embodiment, it is possible to map texture obtained from either the right or left image on triangular patches.

Figure 33:
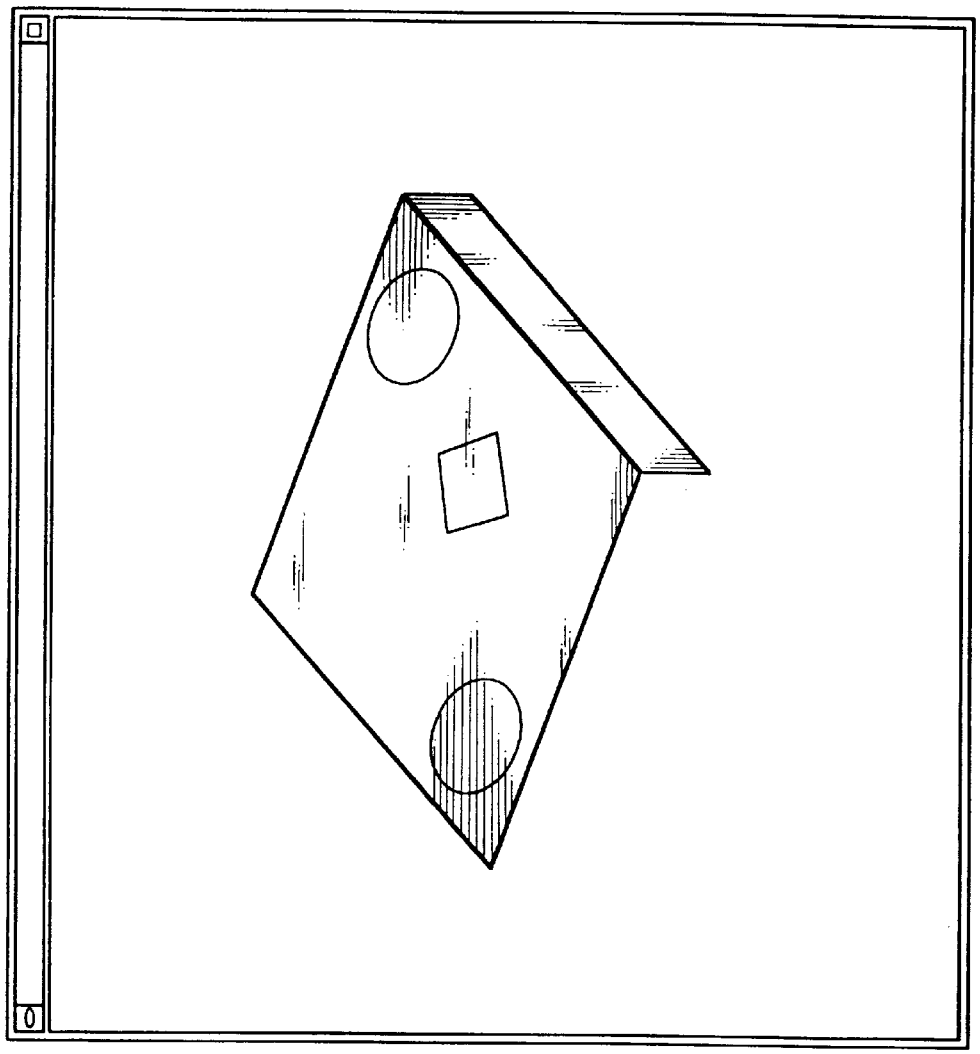
FIG. 33 is a diagram illustrating an example of a three dimensional geometrical shape model expressed with texture mapping.
Figure 34:
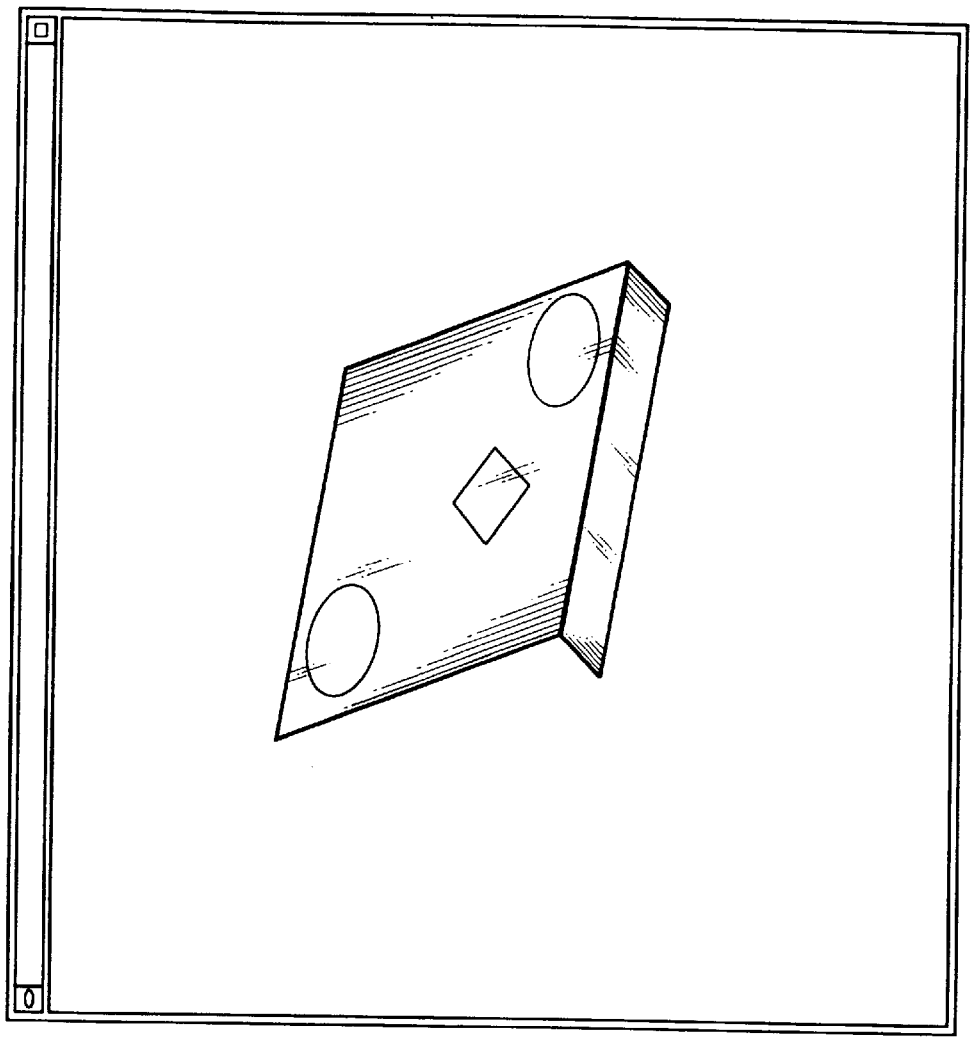
FIG. 34 is a diagram illustrating an example of a three dimensional geometrical shape model expressed with texture mapping.

FIG. 33 shows an example of a three dimensional geometrical shape model on which texture is mapped. FIG. 34 is an example of a three dimensional geometrical shape model seen from a view point different from that in FIG. 33.

<Sixth Embodiment>

In the third embodiment, addition and deletion of corresponding points are performed after three dimensional calculation and generation of three dimensional geometrical shape model are performed. In contrast, in a sixth embodiment, if the determined corresponding points are not correct, three dimensional calculation and generation of three dimensional geometrical shape model based on the corresponding points are not performed.

Figure 35:
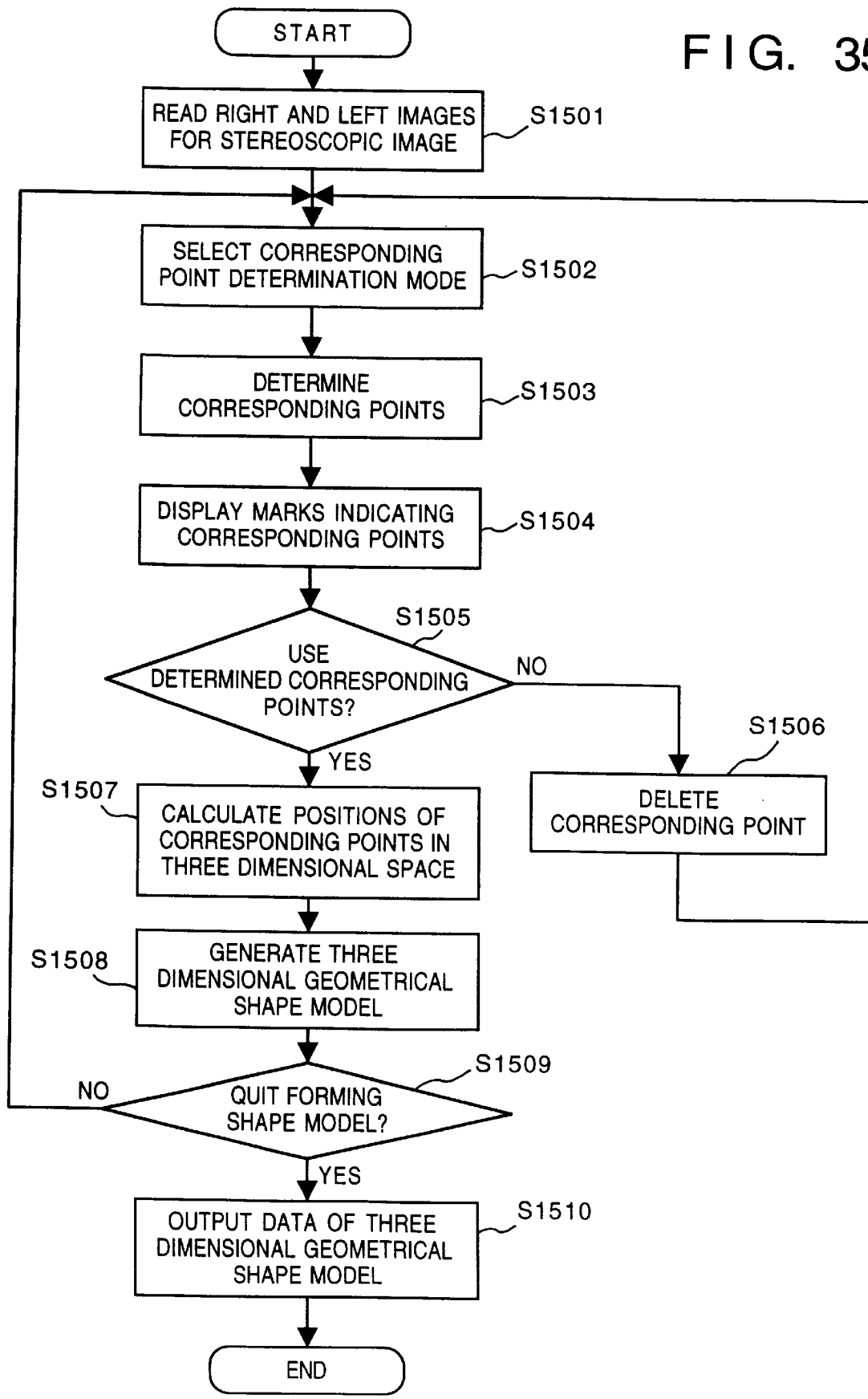
FIG. 35 is a flowchart showing a process according to a sixth embodiment.

The flow of the sixth embodiment is shown in FIG. 35. In FIG. 35, steps S1501, S1502, S1503, S1504, S1506, S1507, S1508, S1509, and S1510 are the same as steps S101, S102, S103, S104, S109, S105, S106, S111, and S107 in FIG. 21, respectively.

In FIG. 35, when corresponding points are determined to be used at step S1505, subsequent processes are the same as those in the third embodiment. On the contrary, when corresponding points are determined not to be used, the corresponding points stop being displayed on right and left images at step S1506. At the same time, data of the corresponding points which are not to be used is deleted.

<Seventh Embodiment>

By employing any one of various kinds of known edge extraction algorithms, it is possible to extract edges from right and left images. The end of an edge is designated instead of designating corresponding points manually at step S301 in FIG. 23.

<Eighth Embodiment>

By employing any one of various kinds of known edge extraction algorithms, it is possible to extract edges from right and left images. The end of an edge can be searched from an area surrounding a point designated at step S301 in FIG. 23, and the end of the edge can be more precisely designated by using the searched point instead of the point designated manually by using a mouse.

<Ninth Embodiment>

As a corresponding point determination mode, a corresponding point search mode and a corresponding point correction mode are provided.

<Tenth Embodiment>

As a corresponding point determination mode, a corresponding point search mode and a manual mode are provided.

<Eleventh Embodiment>

As a corresponding point determination mode, a corresponding point correction mode and a manual mode are provided.

<Twelfth Embodiment>

As a corresponding point determination mode, a corresponding point search mode is provided.

<Thirteenth Embodiment>

As a corresponding point determination mode, a corresponding point correction mode is provided.

<Fourteenth Embodiment>

In the equation (1), correlation is defined as similarity of density values of pixels around corresponding points. In contrast, correlation can be defined as similarity of other characteristics of images than the density values.

<Fifteenth Embodiment>

When the corresponding point correction mode is used as the corresponding point determination mode in the first embodiment, a position of a point designated at step S312 in FIG. 23 is corrected on the basis of a point designated at step S301 as a reference point. In contrast, in a fifteenth embodiment, a position of a point designated at step S301 in FIG. 23 is corrected on the basis of a point designated at step S312 as a reference point.

<Sixteenth Embodiment>

When steps S306 and S311 in FIG. 23 are skipped and a point on the other image is designated at steps S307 and S312, the processes can move to steps S308 and S313, respectively.

According to the third to sixteenth embodiments as described above, following advantages can be obtained.

(0) It is possible to obtain three dimensional shape of an object from the right and left images of a stereoscopic image by providing means for interruptedly designating corresponding points in the right and left images of the stereoscopic image.

(1) It is possible to deal with three dimensional shapes of a plurality of objects separately by providing means for registering and managing the plurality of three dimensional shapes which is included in means for finding three dimensional shape interruptedly from right and left images of a stereoscopic image when a plurality of objects are included in the images.

(2) Further, it is possible to display and confirm three dimensional relationship among a plurality of objects simultaneously by providing means for changing data of a plurality of stored three dimensional shapes and for displaying them.

(3) Since not only three dimensional shapes but also texture information are inputted, it is possible to perform three dimensional texture mapping display without inputting the texture information separately.

(4) Furthermore, regarding an object having a concave area which can not be dealt with if a plane generation method using the Delaunay triangulation net is employed, the object having the concave area can be dealt with by considering the object as a group of a plurality of separated convex objects.

The present invention can be applied to a system constituted by a plurality of devices, or to an apparatus comprising a single device. Furthermore, the invention is applicable also to a case where the object of the invention is attained by supplying a program to a system or apparatus.

According to the present invention as described above, it is possible to deal with each of a plurality of objects which consisting a single stereoscopic image separately.

Further, by extracting data of occluded points in inputted right and left images, more precise three dimensional data can be obtained.

Further, operational environment while extracting three dimensional data from the right and left images can be improved.

The present invention is not limited to the above embodiments and various changes and modifications can be made within the spirit and scope of the present invention. Therefore to appraise the public of the scope of the present invention, the following claims are made.

What is claimed is:

1. An image processing apparatus, comprising:

display means for displaying right and left images of a stereoscopic image having one or more objects in a first area and a second area respectively, and for displaying an image three-dimensionally in a third area;

input means for inputting a plurality of corresponding points of each object in the right and left images displayed in said first and second areas;

management means for managing the plurality of corresponding points of each object;

data generating means for generating three-dimensional data of partial planes defining a surface of each object based upon the plurality of corresponding points of each object managed by said management means; and control means for updating the image displayed three-dimensionally in the third area by using a new partial plane whenever said data generating means generates three-dimensional data for the new partial plane based upon corresponding points input by said input means.

2. The image processing apparatus according to claim 1, wherein said input means includes pointing means for instructing to change objects, and for inputting the corresponding points of each object in the right and left images.

3. The image processing apparatus according to claim 1, wherein said management means includes:

calculation means for calculating three dimensional coordinate data based on the corresponding points inputted by said input means; and polygon forming means for forming polygons as said partial planes on the basis of plural sets of the three dimensional coordinate data calculated by said calculation means, and wherein the surface of each object is independently managed on the basis of a set of polygons formed by said polygon forming means.

4. The image processing apparatus according to claim 3, wherein said polygon forming means forms triangles.

5. The image processing apparatus according to claim 1, wherein said management means includes display means for displaying an image of objects three dimensionally on the basis of a set of three dimensional data of each object to be displayed.

6. The image processing apparatus according to claim 1, wherein said management means includes:

storage means for storing three dimensional coordinate data of each object in a file; and reading means for reading the stored three dimensional coordinate data of each object.

7. An image processing method, comprising:

a display step of displaying right and left images of a stereoscopic image having one or more objects in a first area and a second area respectively, and display an image three-dimensionally in a third area;

an input step of inputting a plurality of corresponding points of each object in the right and left images displayed in said first and second area;

a management step of managing the plurality of corresponding points of each object;

a data generating step of generating three-dimensional data of partial planes defining a surface of each object based upon the plurality of corresponding points of each object in said management step; and updating the image displayed three-dimensionally in the third area by using a new partial plane when three-dimensional data is generated in said data generating step for the new partial plane based upon corresponding points input in said input step.

8. The image processing method according to claim 7, wherein said input step includes a pointing step of instructing to change objects, and of inputting the corresponding points of each object in the right and left images.

9. The image processing method according to claim 7, wherein said management step includes:

a calculation step of calculating three dimensional coordinate data based on the corresponding points inputted at said input step; and a polygon forming step of forming polygons as said partial planes on the basis of plural sets of the three dimensional coordinate data calculated at said calculation step, and wherein the surface of each object is independently managed on the basis of a set of polygons formed at said polygon forming step.

10. The image processing method according to claim 9, wherein triangles are formed at said polygon forming step.

11. The image processing method according to claim 7, wherein said management step includes a displaying step of displaying an image of objects three dimensionally on the basis of a set of three dimensional data of each object to be displayed.

12. The image processing method according to claim 7, wherein said management step includes:

a storing step of storing three dimensional coordinate data of each object in a file; and a reading step of reading the stored three dimensional coordinate data of each object.

13. An image processing apparatus, comprising:

display means for displaying an image having one or more objects in a first area for displaying an image having said one or more objects in a second area, each of the images displayed in the first and second areas being obtained in a different view angle from each other, and for displaying an image three-dimensionally in a third area;

designating means for designating corresponding points of each object displayed in the first and second areas;

data generating means for generating three-dimensional data of each object based upon the designate corresponding points of each object; and control means for updating the image displayed three-dimensionally in the third are based on three-dimensional data generated by said data generating means whenever a predetermined number of corresponding points are designated by said designating means, wherein images in the first, second and third areas are displayed at the same time.

14. The image processing apparatus according to claim 13, wherein said designating means includes a pointing means for changing objects, and an inputting means for inputting the corresponding points of each object in the right and left images.

15. The image processing apparatus according to claim 13, wherein said data generating means includes:

calculation means for calculating three-dimensional coordinate data based on the designated corresponding points; and polygon forming means for forming polygons on the basis of plural sets of the three-dimensional coordinate data calculated by said calculation means.

16. The image processing apparatus according to claim 15, wherein said polygon forming means forms triangles.

17. The image processing apparatus according to claim 13, wherein said data generating means includes:

storage means storing three-dimensional coordinate data of each object in a file; and reading means for reading the stored three-dimensional coordinate data of each object.

18. A computer readable medium having recorded thereupon codes for implementing a computer implementable method for image processing comprising:

a display step of displaying right and left images of a stereoscopic image having one or more objects in a first area and a second area respectively, and displaying an image three-dimensionally in a third area;

an input step of inputting corresponding points of each object in the right and left images displayed in said first and second areas;

a management step of managing the inputted corresponding points of each object;

a data generating step of generating three-dimensional data of each object based upon the inputted corresponding points of each object in said management step; and control step of updating the image displayed three-dimensionally in the third area based on three-dimensional data generated in said data generating step whenever a predetermined number of corresponding points are designated in said designating step, wherein images in the first, second and third areas are displayed at the same time.

19. The image processing apparatus according to claim 1, wherein a new partial plane is written in said first and second area whenever inputting corresponding points.

20. The image processing apparatus according to claim 1, wherein the size of said third area is smaller than that of said first or second area.

21. The image processing apparatus according to claim 1, wherein said corresponding points of each object in the right and left images lie on a guide line for partial surfaces.

22. The image processing method according to claim 7, wherein a new partial plane is written in said first and second area whenever inputting corresponding points.

23. The image processing method according to claim 7, wherein the size of said third area is smaller than that of said first or second area.

24. The image processing method according to claim 7, wherein said corresponding points of each object in the right and left images lie on a guide line for partial surfaces.

* * * * *

UNITED STATES PATENT AND TRADEMARK OFFICE
CERTIFICATE OF CORRECTION

PATENT NO.  : 6,023,276
DATED       : February 8, 2000
INVENTOR(S) : TOMOAKI KAWAI ET AL.

Page 1 of 4

It is certified that error appears in the above-identified patent and that said Letters Patent is hereby corrected as shown below:

ON THE TITLE PAGE:

[56] References Cited,

Under FOREGN PATENT DOCUMENTS:

"7152928" should read --7-152928--.

[57] ABSTRACT:

"model" should read --models--.

IN THE DRAWINGS:

Sheet 9 of 32, FIG. 12, "COFIRMING" should read --CONFIRMING--.

COLUMN 1:

Line 12, "picked-up" should read --picked up--;
Line 21, "great" should read --a great--;
Line 56, "it" should read --as it--; and
Line 67, "its" should read --as its--.

COLUMN 2:

Line 30, "improve" should read --improve the--.

COLUMN 3:

Line 11, "point" should read --points--; and
Line 14, "gap in" should read --a gap in the--.

UNITED STATES PATENT AND TRADEMARK OFFICE
CERTIFICATE OF CORRECTION

PATENT NO.    : 6,023,276
DATED         : February 8, 2000
INVENTOR(S)   : TOMOAKI KAWAI ET AL.

It is certified that error appears in the above-identified patent and that said Letters Patent is hereby corrected as shown below:

COLUMN 4:

Line 14, "a" should be deleted.

COLUMN 5:

Line 18, "and it displays an image" should be deleted;
    Line 36, "by" should read --with--; and
    Line 49, "data, programs" should read --data programs--.

COLUMN 6:

Line 13, "instruct" should read --instruction--; and
    Line 41, "has" should read --has the--.

COLUMN 8:

Line 2, "having" should read --having the--;
    Line 14, "other several" should read --several other--; and
    Line 20, "aforesaid" should read --the aforesaid--.

COLUMN 9:

Line 41, "is" should read --are--; and
    Line 55, "displayed" should read --a displayed--.

COLUMN 10:

Line 17, "a It" should read --it--; and
    Line 25, "is" should read --are--.

UNITED STATES PATENT AND TRADEMARK OFFICE
CERTIFICATE OF CORRECTION

PATENT NO. : 6,023,276
DATED : February 8, 2000
INVENTOR(S) : TOMOAKI KAWAI ET AL.

It is certified that error appears in the above-identified patent and that said Letters Patent is hereby corrected as shown below:

COLUMN 11:

Line 13, "is" should read --are--;
    Line 19, "designates" should read --designate--;
    Line 21, "following" should read --the following--; and
    Line 37, "corresponds" should read --correspond--.

COLUMN 12:

Line 36, "model is" should read --models are--.

COLUMN 14:

Line 64, "22 Then," should read --22. Then,--.

COLUMN 15:

Line 4, "store" should read --stored--;
    Line 20, "is" should read --are--; and
    Line 41, "floor on" should read --the floor--.

COLUMN 17:

Line 2, "three" should read --a three--.

COLUMN 18:

Line 49, "which" should be deleted; and
    Line 50, "a" should read --of a--.

COLUMN 19:

Line 47, "display" should read --displaying--.

UNITED STATES PATENT AND TRADEMARK OFFICE
CERTIFICATE OF CORRECTION

| | | |
|---|---|---|
| PATENT NO. | : | 6,023,276 |
| DATED | : | February 8, 2000 |
| INVENTOR(S) | : | TOMOAKI KAWAI ET AL. |

It is certified that error appears in the above-identified patent and that said Letters Patent is hereby corrected as shown below:

COLUMN 20:

Line 38, "designate" should read --designated--; and
Line 41, "are" should read --area--.

COLUMN 21:

Line 19, "control" should read --a control--.

Signed and Sealed this

Twenty-fourth Day of April, 2001

Attest:

NICHOLAS P. GODICI

Attesting Officer

Acting Director of the United States Patent and Trademark Office